(12) United States Patent
Kelley

(10) Patent No.: US 11,014,754 B2
(45) Date of Patent: May 25, 2021

(54) SPIRAL CONVEYOR SYSTEM FOR IMMERSING ITEMS IN A LIQUID

(71) Applicant: Steven Kelley, Halifax (CA)

(72) Inventor: Steven Kelley, Halifax (CA)

(*) Notice: Subject to any disclaimer, the term of this patent is extended or adjusted under 35 U.S.C. 154(b) by 0 days.

(21) Appl. No.: 16/605,051

(22) PCT Filed: May 2, 2018

(86) PCT No.: PCT/CA2018/000083
§ 371 (c)(1),
(2) Date: Oct. 14, 2019

(87) PCT Pub. No.: WO2018/213915
PCT Pub. Date: Nov. 29, 2018

(65) Prior Publication Data
US 2020/0324977 A1    Oct. 15, 2020

(30) Foreign Application Priority Data

May 24, 2017   (CA) ..................................... 2968115

(51) Int. Cl.
| | | |
|---|---|---|
| *B65G 15/58* | (2006.01) | |
| *B65G 21/18* | (2006.01) | |
| *B65G 15/10* | (2006.01) | |

(52) U.S. Cl.
CPC ............. *B65G 21/18* (2013.01); *B65G 15/10* (2013.01); *B65G 15/58* (2013.01); *B65G 2203/0233* (2013.01); *B65G 2207/24* (2013.01)

(58) Field of Classification Search
CPC ........ B65G 15/10; B65G 15/58; B65G 21/18; B08B 9/24
USPC .............................. 198/778; 134/132; 99/365
See application file for complete search history.

(56) References Cited

U.S. PATENT DOCUMENTS

| | | | |
|---|---|---|---|
| 1,907,649 A | 5/1933 | Marx | |
| 2,119,191 A | 5/1938 | Wilkinson et al. | |
| 3,269,142 A * | 8/1966 | De Mola | F25D 13/067 |
| | | | 62/381 |
| 3,302,423 A | 2/1967 | Morrison | |
| 3,315,492 A * | 4/1967 | Dreksler | A23L 3/361 |
| | | | 62/381 |
| 3,348,659 A * | 10/1967 | Roinestad | F25D 13/067 |
| | | | 198/778 |
| 3,412,476 A * | 11/1968 | Stureastrom | A23L 3/361 |
| | | | 34/147 |
| 3,733,848 A * | 5/1973 | Duron | F25D 3/11 |
| | | | 62/381 |
| 3,834,408 A * | 9/1974 | Thalacker | C23G 5/04 |
| | | | 134/83 |

(Continued)

OTHER PUBLICATIONS

PCT, Canadian Intellectual Property Office (ISA/CA), International Search Report, International Application No. PCT/CA2018/000083, 3 pages (dated Jun. 11, 2018).

(Continued)

*Primary Examiner* — Douglas A Hess
(74) *Attorney, Agent, or Firm* — Thompson Hine LLP

(57) ABSTRACT

A spiral conveyor system including a tank for containing a liquid at a predetermined temperature therein. A conveyor conveys items through the liquid. A guiding structure is disposed in the tank for guiding the conveyor in a spiral-type fashion. The spiral conveyor system further comprises means for securing the items while being conveyed through the liquid.

21 Claims, 30 Drawing Sheets

(56) References Cited

U.S. PATENT DOCUMENTS

| | | | | |
|---|---|---|---|---|
| 4,022,638 | A * | 5/1977 | Weet | H01B 15/00 |
| | | | | 75/715 |
| 4,450,953 | A | 5/1984 | Le Cann et al. | |
| 4,798,062 | A * | 1/1989 | Lipinski | B65G 21/18 |
| | | | | 198/778 |
| 4,852,720 | A * | 8/1989 | Roinestad | B65G 21/18 |
| | | | | 198/778 |
| 4,893,708 | A * | 1/1990 | Machacek | B65G 21/18 |
| | | | | 198/778 |
| 5,205,135 | A * | 4/1993 | Lang | A23L 3/361 |
| | | | | 62/381 |
| 5,259,302 | A * | 11/1993 | Chen | A47J 37/044 |
| | | | | 134/132 |
| 5,398,521 | A * | 3/1995 | Baron | B65G 21/18 |
| | | | | 62/381 |
| 6,531,172 | B2 * | 3/2003 | Perrine | A23L 3/10 |
| | | | | 426/467 |
| 6,740,298 | B1 * | 5/2004 | Raginskii | G21C 19/44 |
| | | | | 422/274 |
| 6,912,869 | B2 * | 7/2005 | Lang | A21B 1/245 |
| | | | | 62/378 |
| 9,481,523 | B2 * | 11/2016 | Talsma | B65G 21/18 |
| 2004/0020749 | A1 | 2/2004 | Wood et al. | |

OTHER PUBLICATIONS

PCT, Canadian Intellectual Property Office (ISA/CA), Written Opinion of the International Searching Authority, International Application No. PCT/CA2018/000083, 5 pages (dated Jun. 11, 2018).

* cited by examiner

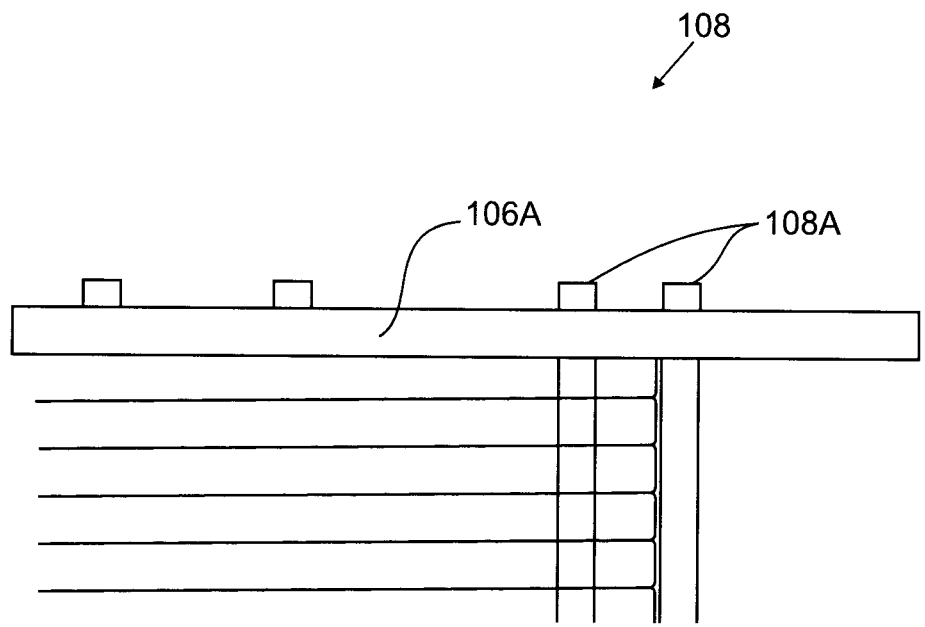
Figure 1c (Detail A)
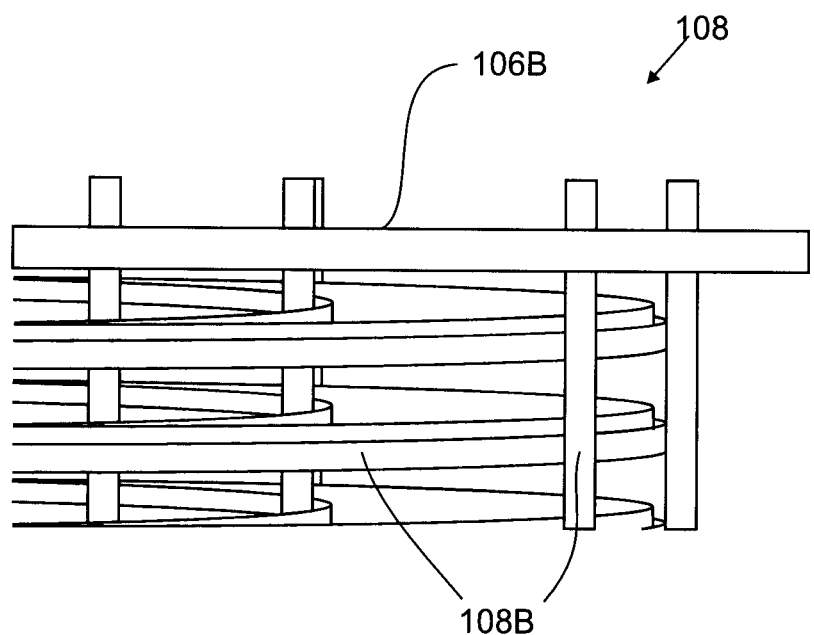
Figure 1d (Detail A)

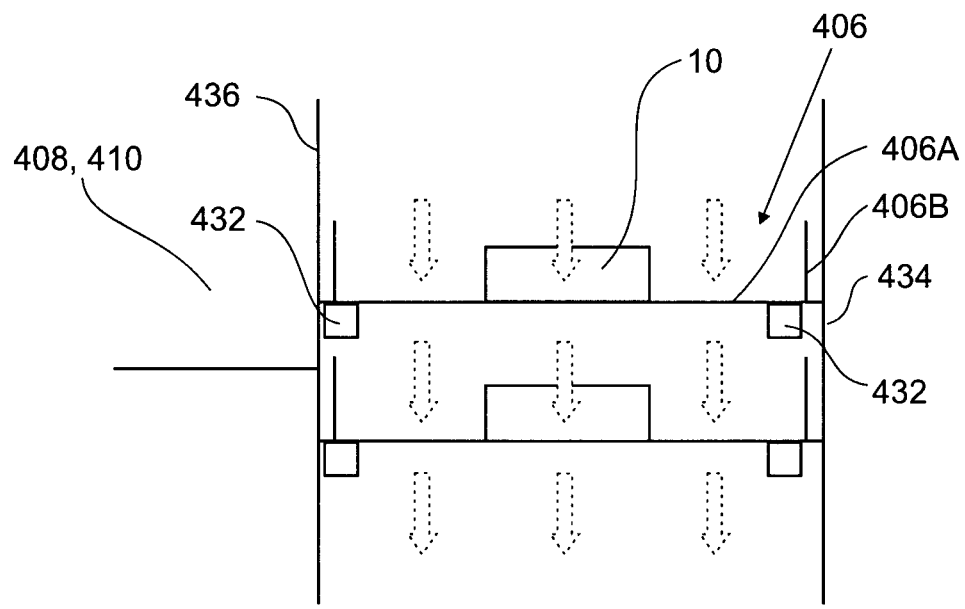
Figure 11b (Detail B)
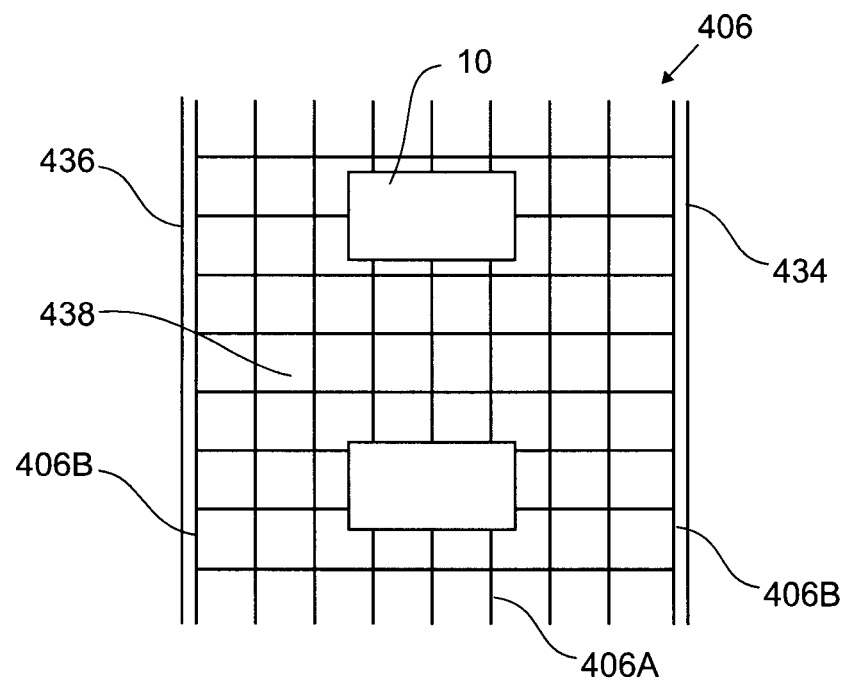
Figure 11c (Detail B)

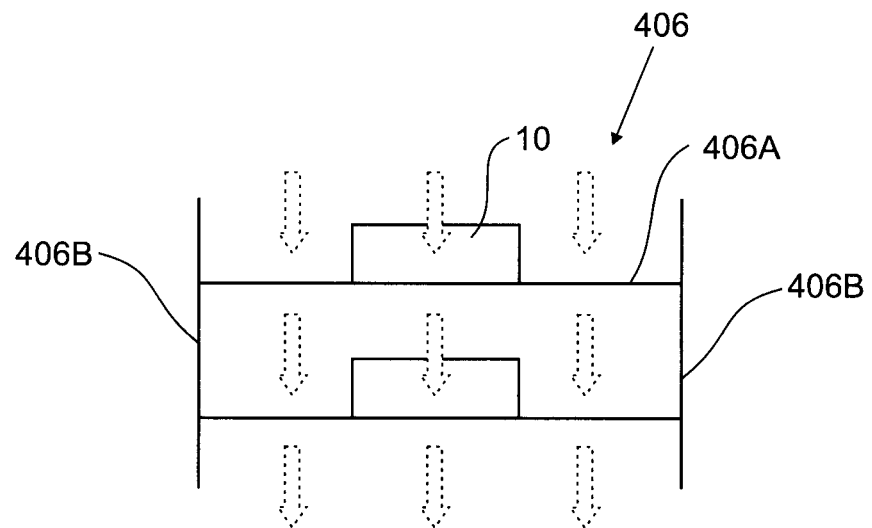
Figure 11d (Detail B)
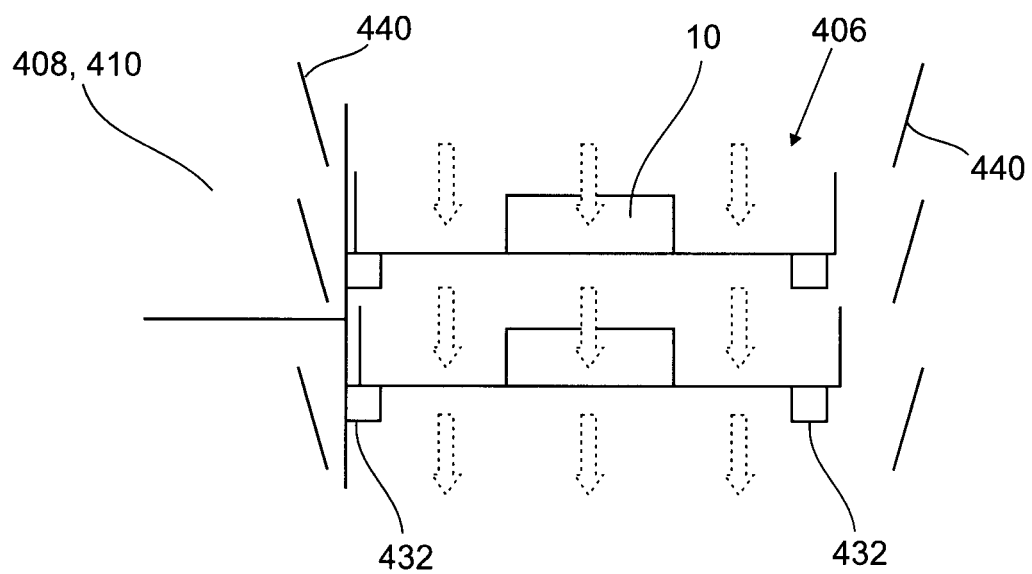
Figure 11e (Detail B)

SPIRAL CONVEYOR SYSTEM FOR IMMERSING ITEMS IN A LIQUID

CROSS-REFERENCE TO RELATED APPLICATIONS

This application is a national stage filing of International Application No. PCT/CA2018/000083, International Publication No. WO 2018/213915, filed on May 2, 2018, which claims priority to Canadian Patent Application No. 2,968,115, filed on May 24, 2017. The entire contents of both of these applications are incorporated by reference herein.

FIELD

The present invention relates to conveying systems for transporting items, and more particularly to a spiral conveyor system for transporting items immersed in a liquid for heating, cooling, or chemically treating the same.

BACKGROUND

In present-day large-scale processing of items such as, for example, chilling, freezing, pasteurizing, cooking, or chemically treating food products, conveying systems are employed in order to provide a continuous flow of the products through the process. In order to provide a relatively long path length within an insulated enclosure of minimal volume and external surface area, a conveyor which transports the items through the enclosure is typically adapted to follow a helical path—termed 'spiral' path in the industry. During transport inside the enclosure, the items are exposed to air heated or chilled to a predetermined temperature or cryogenic gas contained in the enclosure.

Unfortunately, due to the relatively low heat transfer rate between the air or cryogenic gas and the items, the processing still requires exposure of the items to the air or cryogenic gas for a substantial length of time, thus requiring a substantial path length inside the enclosure—i.e. a substantial size of the enclosure—or a very slow movement of the conveyor.

The heat transfer rate between a liquid, such as, for example, water or brine, and the items is substantially larger than the heat transfer rate between the air or cryogenic gas and the items. Therefore, employment of water or brine for the processing requires exposure of the items thereto for a substantially shorter length of time, thus reducing energy consumption and enabling use of a substantially shorter path length inside the enclosure resulting in a smaller system or a higher speed of the conveyor enabling increased throughput.

Furthermore, transportation of a liquid through the system is substantially more efficient and, therefore, cost effective, than the transportation of air.

However, employment of conventional conveyors for submerging the items in a liquid is limited since many items have a density that is less than the density of the liquid. The resulting buoyancy then causes the items to dislodge from their place on the conveyor, clog the conveyor, or float on the liquid surface, likely damaging the item or its packaging resulting in inefficient handling and processing. These effects may also be experienced when the density of the item is not sufficiently larger than the density of the liquid to create enough friction for the item to stay in place on the conveyor against the force of the flow of the liquid.

It may be desirable to provide a spiral conveyor system for transporting items immersed in a liquid for heating, cooling, or chemically treating the same.

It also may be desirable to provide a spiral conveyor system for transporting items immersed in a liquid for heating, cooling, or chemically treating the same that is designed such that the items while submerged in the liquid are secured.

It also may be desirable to provide a spiral conveyor system for transporting items immersed in a liquid for heating, cooling, or chemically treating the same that provides a relatively long path length of the conveyor while minimizing the size of the enclosure containing the liquid.

SUMMARY

Accordingly, one object of the present invention is to provide a spiral conveyor system for transporting items immersed in a liquid for heating, cooling, or chemically treating the same.

Another object of the present invention is to provide a spiral conveyor system for transporting items immersed in a liquid for heating, cooling, or chemically treating the same that is designed such that the items while submerged in the liquid are secured.

Another object of the present invention is to provide a spiral conveyor system for transporting items immersed in a liquid for heating, cooling, or chemically treating the same that provides a relatively long path length of the conveyor while minimizing the size of the enclosure containing the liquid.

According to one aspect of the present invention, there is provided a spiral conveyor system. The spiral conveyor system comprises a tank for containing a liquid at a predetermined temperature therein. A conveyor conveys items through the liquid. A guiding structure is disposed in the tank for guiding the conveyor in a spiral-type fashion. The spiral conveyor system further comprises means for securing the items while being conveyed through the liquid.

According to one aspect of the present invention, there is provided a spiral conveyor system. The spiral conveyor system comprises a tank for containing a liquid at a predetermined temperature therein. A conveyor conveys items through the liquid. A guiding structure is disposed in the tank for guiding the conveyor in a spiral-type fashion. The spiral conveyor system further comprises a securing conveyor placed a predetermined distance above the conveyor. The securing conveyor is adapted to be oriented parallel to the conveyor and to be moved in a same direction and at a same speed as the conveyor while the items are conveyed through the liquid.

According to one aspect of the present invention, there is provided a spiral conveyor system. The spiral conveyor system comprises a tank for containing a liquid at a predetermined temperature therein. A conveyor conveys items through the liquid. A guiding structure is disposed in the tank for guiding the conveyor in a spiral-type fashion. The items are secured by generating a substantially downward oriented flow of the liquid through the conveyer using a liquid input structure placed above the conveyor for providing the liquid and a liquid output structure placed below the conveyor for removing the liquid.

One advantage of the present invention is that it provides a spiral conveyor system for transporting items immersed in a liquid for heating, cooling, or chemically treating the same.

A further advantage of the present invention is that it provides a spiral conveyor system for transporting items immersed in a liquid for heating, cooling, or chemically treating the same that is designed such that the items while submerged in the liquid are secured.

A further advantage of the present invention is to provide a spiral conveyor system for transporting items immersed in a liquid for heating, cooling, or chemically treating the same that provides a relatively long path length of the conveyor while minimizing the size of the enclosure containing the liquid.

BRIEF DESCRIPTION OF THE DRAWINGS

An embodiment of the present invention is described below with reference to the accompanying drawings, in which:

FIGS. 1c and 1d are simplified block diagrams illustrating in a side view a detail of the spiral conveyor system for immersing items in a liquid according to a first embodiment of the invention;

DETAILED DESCRIPTION

Figure 1A:
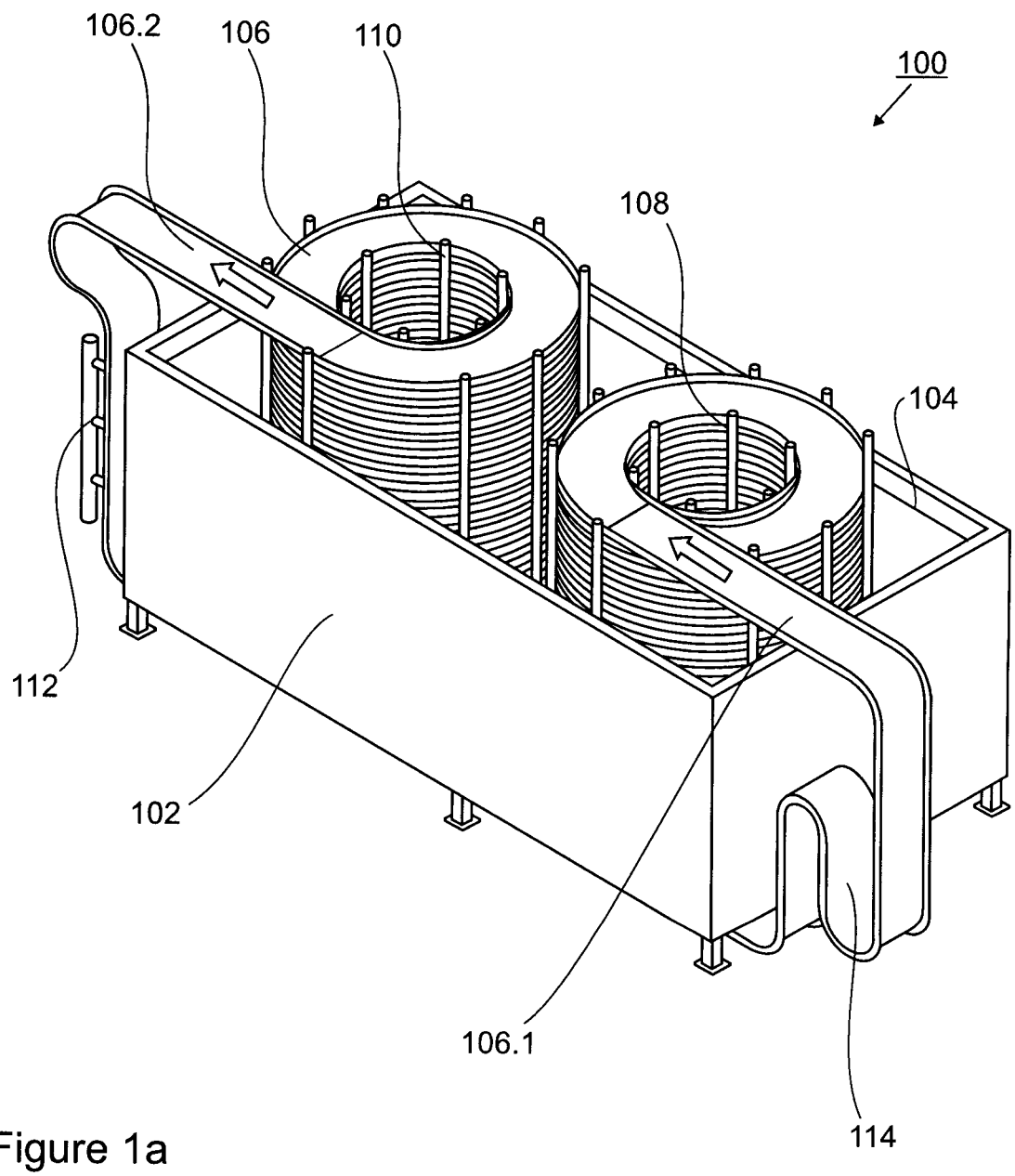
FIGS. 1a and 1b are simplified block diagrams illustrating in a perspective view and a cross-sectional view, respectively, a spiral conveyor system for immersing items in a liquid according to a first embodiment of the invention.
Figure 1B:
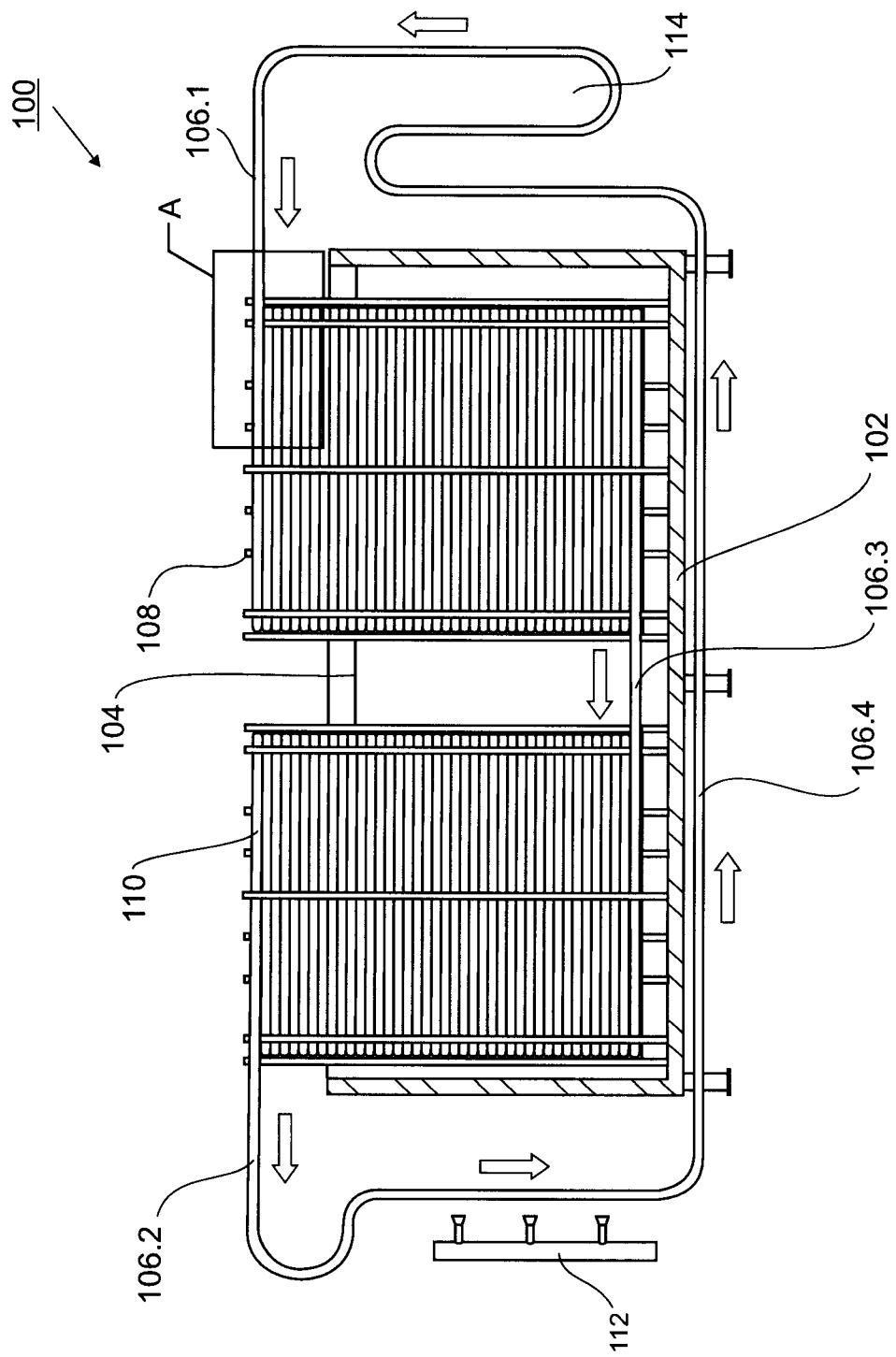

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

Referring to FIGS. 1a to 1d, a spiral conveyor system for immersing items in a liquid 100 according to a first embodiment of the invention is provided. The spiral conveyor system 100 comprises tank 102 containing the liquid 104 such as, for example, water or brine, therein. The liquid 104 has a predetermined temperature for processing the items—such as, for example, for chilling, freezing, pasteurizing, or cooking the items—while being immersed therein. For example, the liquid 104 is heated or cooled outside the tank 102 and then circulated through the tank 102 using a pump mechanism (not shown). Optionally, liquids 104 other than water or brine are employed, for example, for chemically treating the items when immersed therein.

Conveyor 106 receives the items at entry section 106.1—for example, the items are dropped thereon using another conveyor disposed thereabove—and transports the same downward via spiral 108, as indicated by the block arrows. At the bottom of the spiral 108 the conveyor 106 crosses over—via cross-over section 106.3—to spiral 110 for transporting the items upward to exit section 106.2 where the items are, for example, dropped onto another conveyor placed below. The conveyor 106 forming a closed loop is then returned, for example, by guiding the same below the tank 102—section 106.4—and via adjustment section 114 to entry section 106.1. The conveyor 106 can be cleaned—for example, when brine is disposed in the tank 102—using conveyor washing mechanism 112 placed, for example, after the exit section 106.2. The, conveyor washing mechanism 112 comprises, for example, a set of spray nozzles for spraying water or cleaning solution as the conveyor 106 passes by. The conveyor 106 may be a conventional self-stacking conveyor 106A, as illustrated in FIG. 1c, where side walls of the conveyor are adapted for being stacked upon each other while being guided to form the spiral—for example, spiral 108 illustrated in FIG. 1c—using spiral guiding elements 108A. Alternatively, conventional conveyor 106B is moved in a spiral using a conventional spiral support structure 108B, as illustrated in FIG. 1d, with the spiral support structure 108B providing guidance as well as support.

Figure 1E:
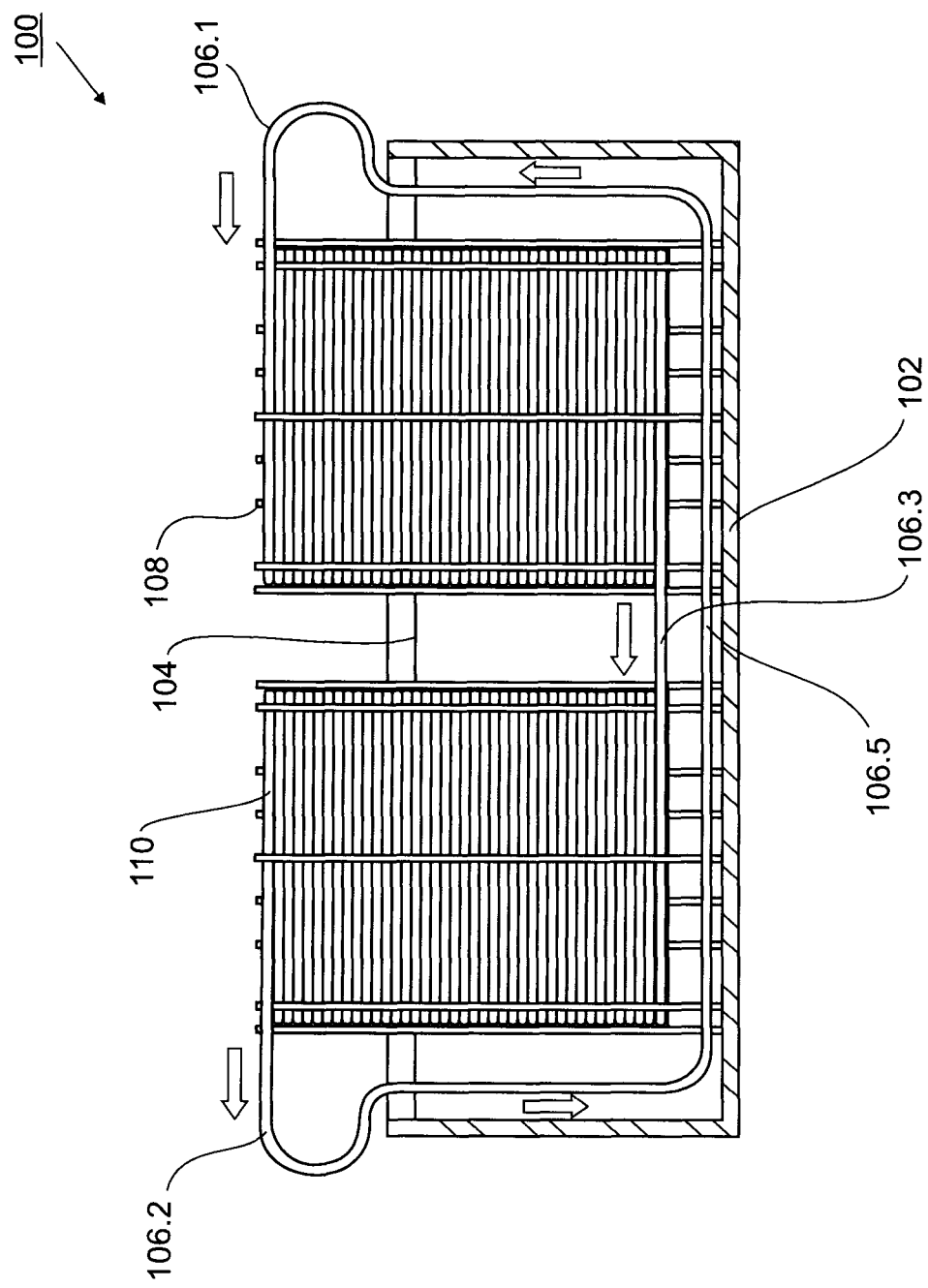
FIG. 1e is a simplified block diagram illustrating in a cross-sectional view the spiral conveyor system for immersing items in a liquid according to the first embodiment of the invention with conveyor return inside the tank.

Alternatively, the conveyor 106 is guided at the exit section 106.2 back into the tank 102 and returned to the entry section 106.1 through the liquid 104—section 106.5—inside the tank 102. For example, the conveyor section 106.5 is placed in proximity to the bottom of the tank 102, as illustrated in FIG. 1e, but is not limited thereto and may be placed at other locations in the tank 102 depending on design preferences. The conveyor washing mechanism 112 and the conveyor adjustment section 114 (not shown) may be placed, for example, near the entry section 106.1 or the exit section 106.2 above the fill level of the liquid 104 in the tank 102.

Further alternatively, two connected tanks are provided with each tank surrounding a respective spiral 108, 110 and the connection enclosing the cross-over section 106.3.

The conveyor 106 is of conventional design with a plurality of connected sections made of a metal such as, for example, stainless steel, or plastic material such as, for example, Nylon. Alternatively, the conveyor 106 is of a belt-type structure made of a sufficiently flexible material. The conveyor 106 is driven using, for example, a conventional center drum with friction drive or direct drive.

Figure 2A:
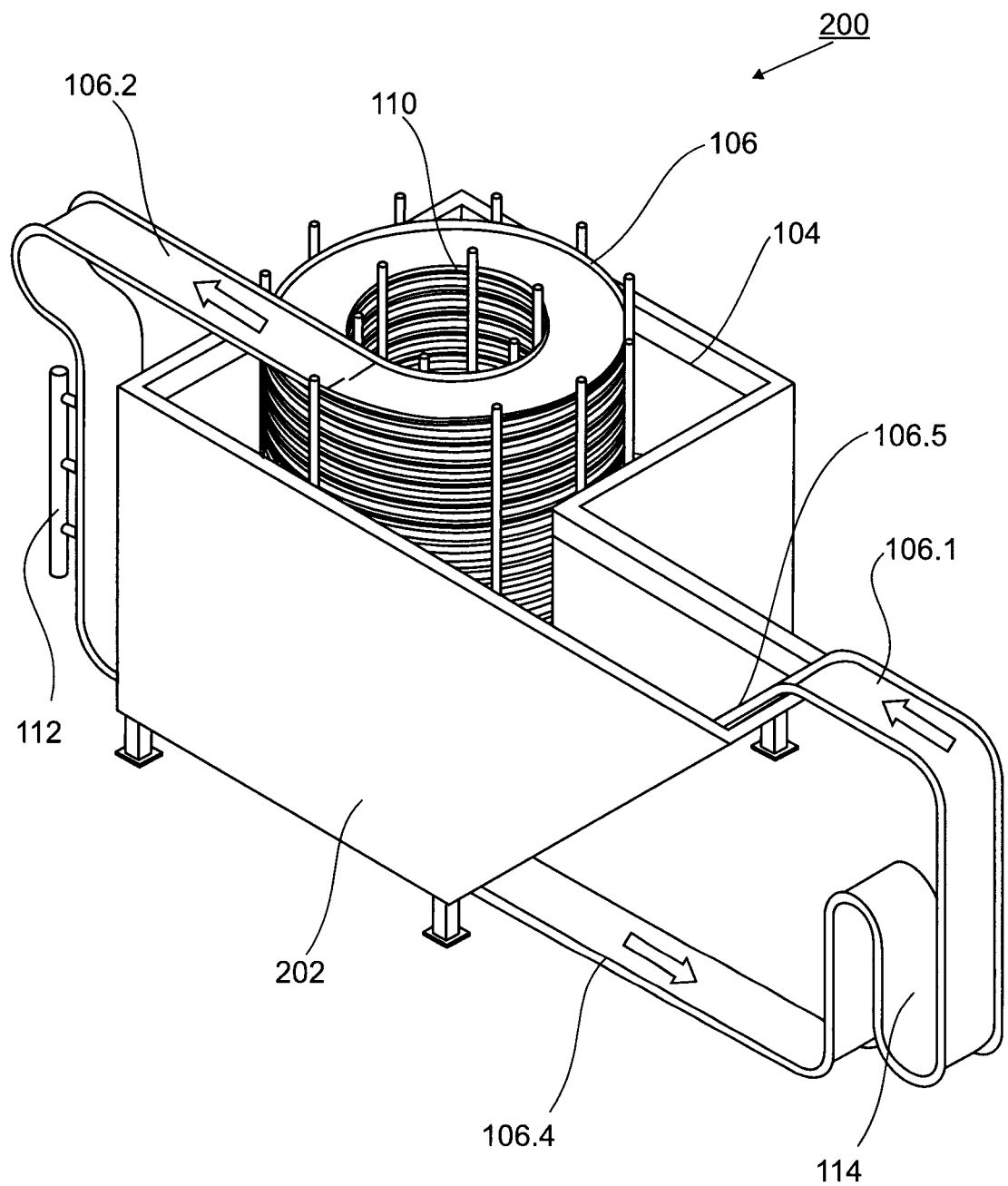
FIGS. 2a and 2b are simplified block diagrams illustrating in a perspective view and a cross-sectional view, respectively, a spiral conveyor system for immersing items in a liquid according to a second embodiment of the invention.
Figure 2B:
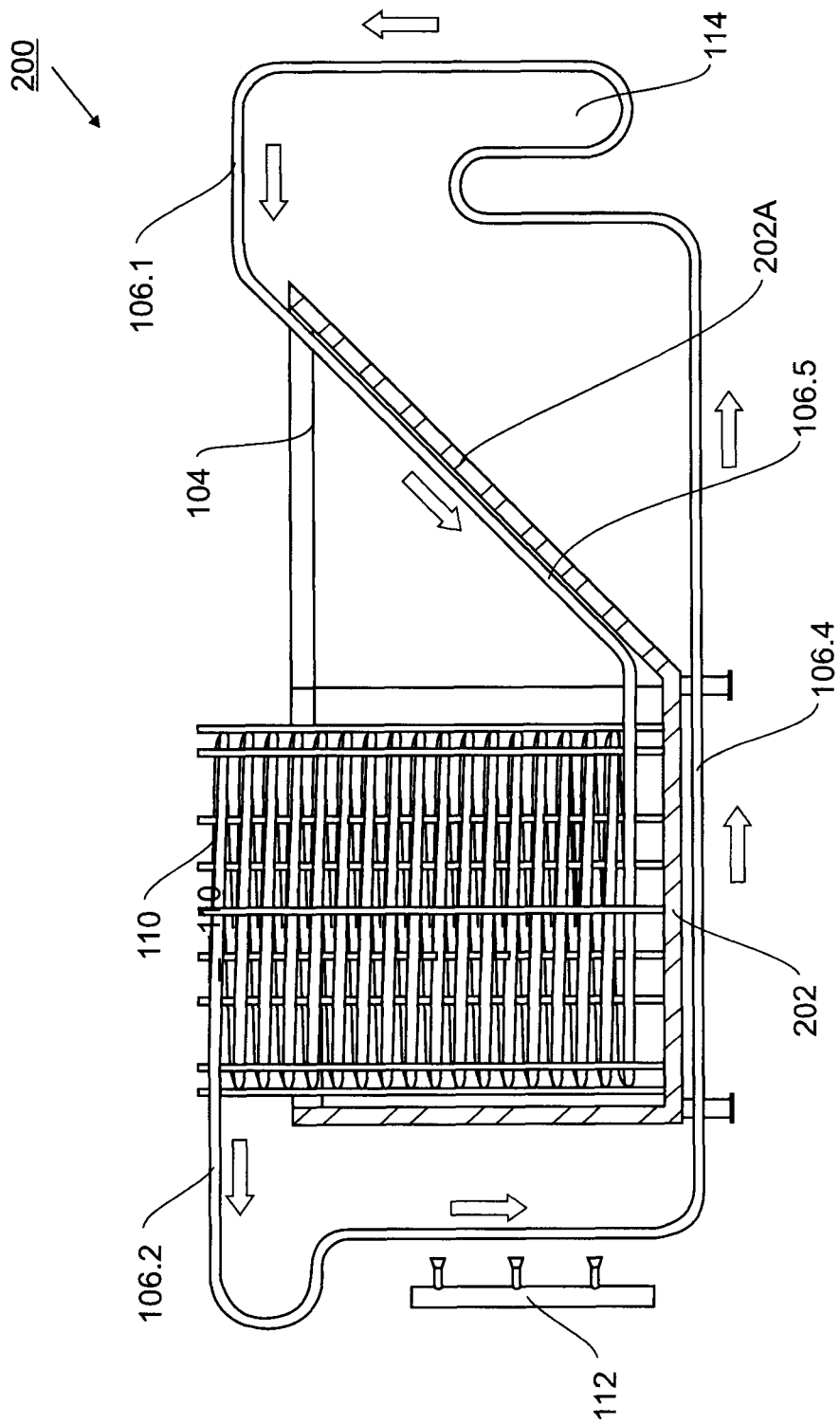

Referring to FIGS. 2a and 2b, a spiral conveyor system for immersing items in a liquid 200 according to a second embodiment of the invention is provided. In the spiral conveyor system 200 the conveyor 106 is guided downward from the entry section 106.1 to the bottom of tank 202 via sloped section 106.5, 202A. The items are then transported upward from the bottom to the exit section 106.2 via spiral 110. Alternatively, the spiral conveyor system 200 may be designed to operate in reverse with the spiral being used for transporting the items downward and the slope for transporting the items upward.

Figure 3A:
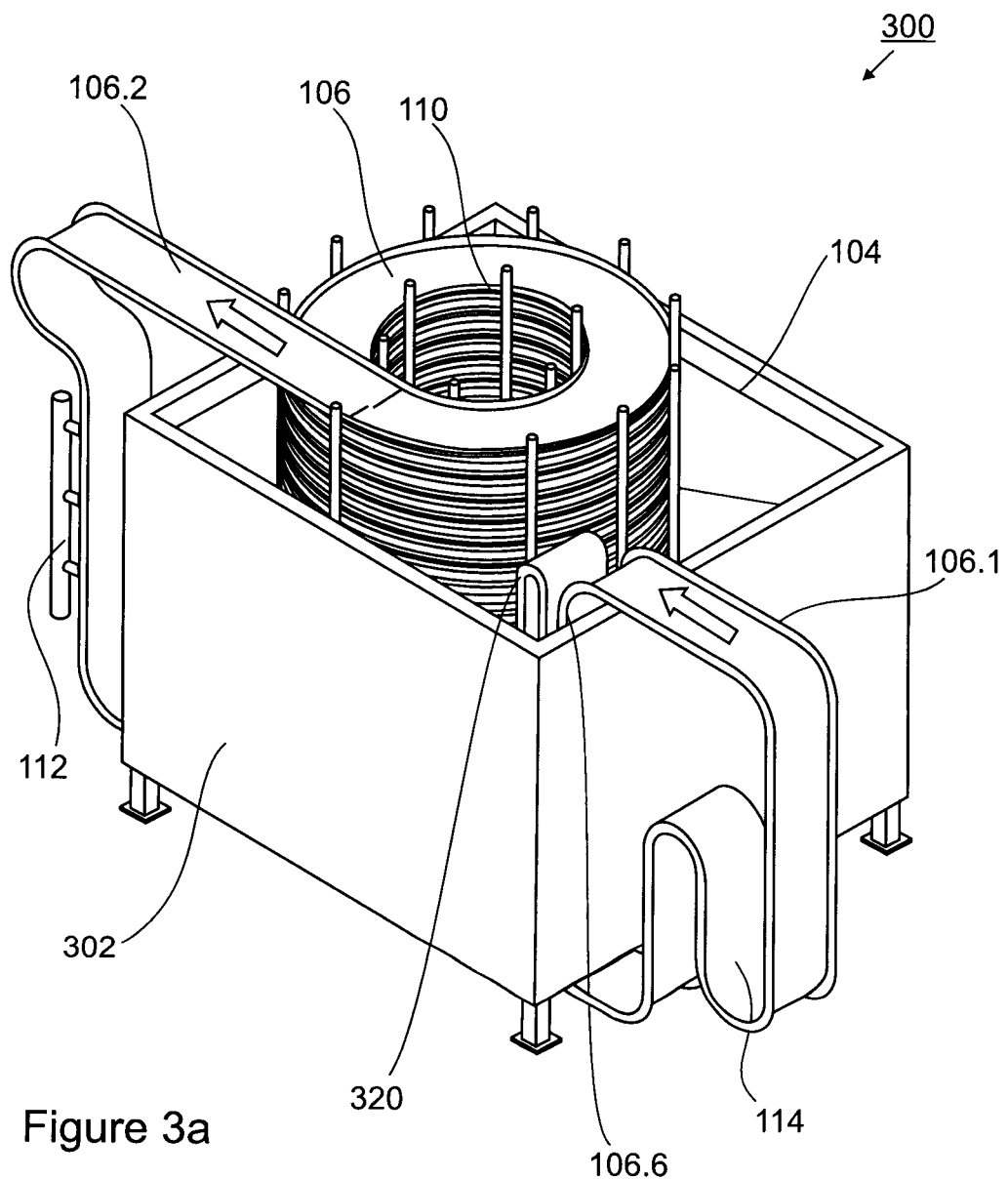
FIGS. 3a and 3b are simplified block diagrams illustrating in a perspective view and a cross-sectional view, respectively, a spiral conveyor system for immersing items in a liquid according to a third embodiment of the invention.
Figure 3B:
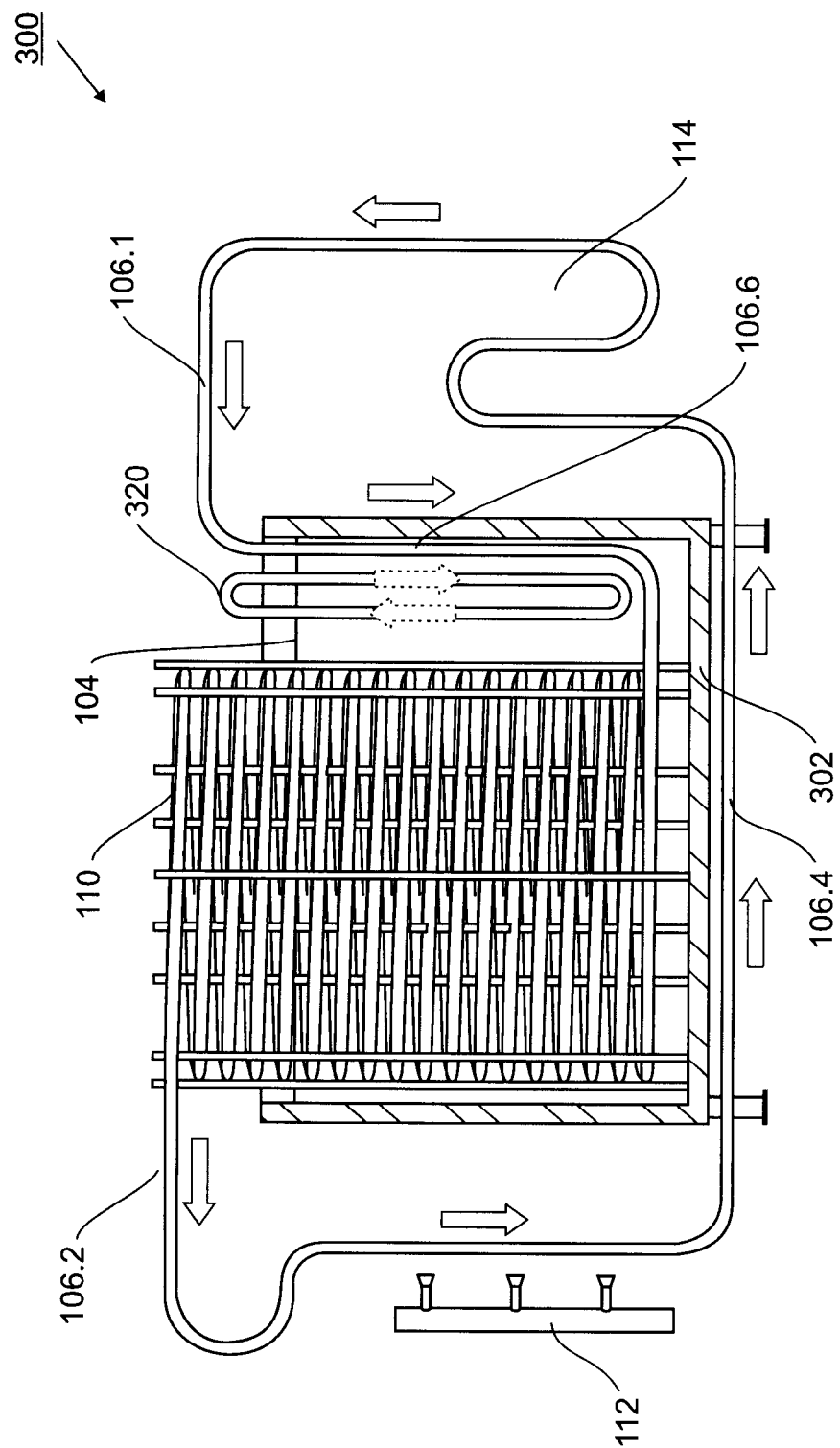

Referring to FIGS. 3a and 3b, a spiral conveyor system for immersing items in a liquid 300 according to a third embodiment of the invention is provided. In the spiral conveyor system 300 the conveyor 106 is guided substantially vertically downward from the entry section 106.1 to the bottom of tank 302 via drop down section 106.6. The items are then transported upward from the bottom to the exit section 106.2 via spiral 110. While being transported through the drop down section 106.6 the items are secured to the conveyor 106 via securing conveyor 320 which is placed such that the securing conveyor is oriented parallel to the conveyor 106 at a distance adapted to the size of the items for securing the same therebetween. The securing conveyor 320 is designed such that the portion facing the conveyor 106 is moving in a same direction and at a same speed as the conveyor 106, as indicated by the block arrows in FIG. 3b.

It is noted that the securing conveyor 320 may also be employed in the spiral conveyor system 200 for securing the items during conveying along the sloped section 106.5.

While conventional conveyors work well for transporting items immersed in a liquid when the density of the items is substantially larger than the density of the liquid, the employment of the conventional conveyors for submerging the items in a liquid is limited when the density of the items is less than the density of the liquid or not sufficiently larger than the density of the liquid as is the case with many food products causing the problems described hereinabove. In order to enable use of the spiral conveyor systems 100, 200, 300 for transporting items immersed in a liquid when the density of the items is less than the density of the liquid, the spiral conveyor systems 100, 200, 300 are provided with securing mechanisms according to the invention for securing the items to the conveyor.

Figure 4A:
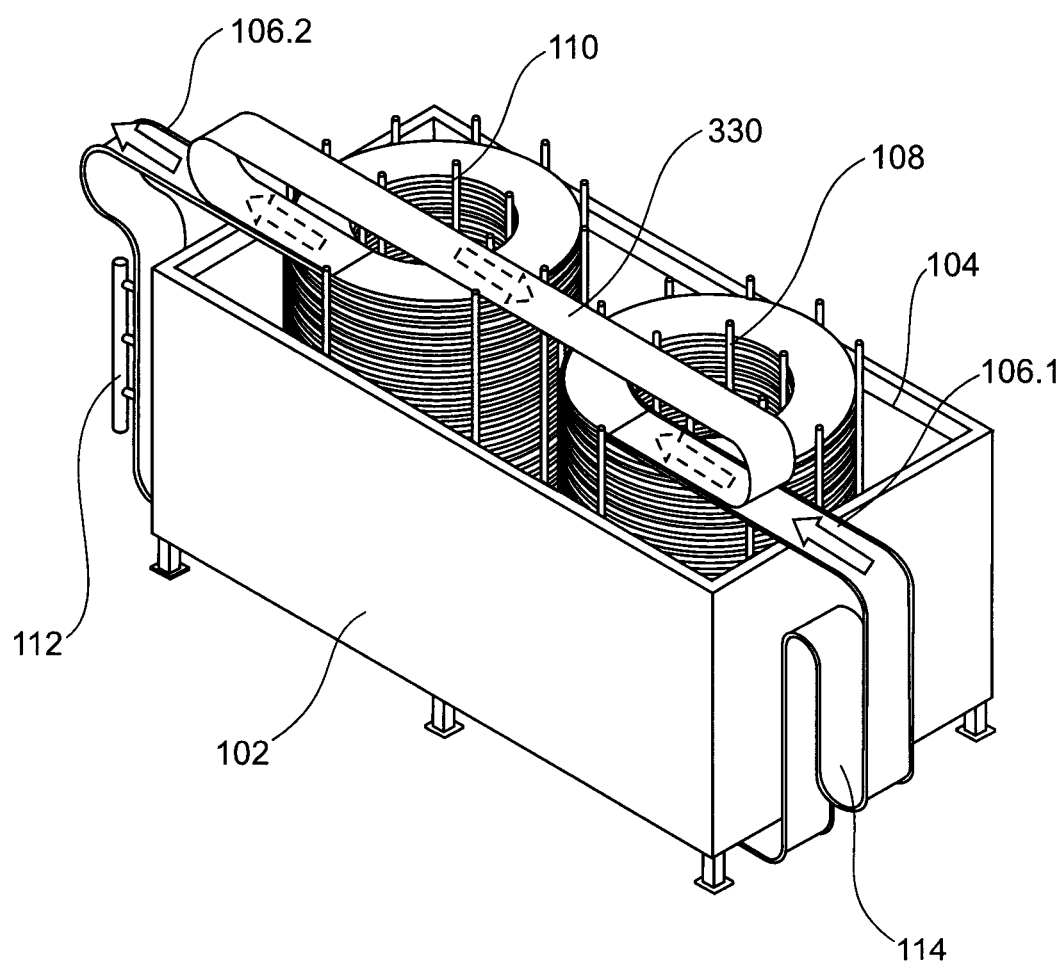
FIG. 4a is a simplified block diagram illustrating in a perspective view a securing conveyor according to an embodiment of the invention.
Figure 4B:
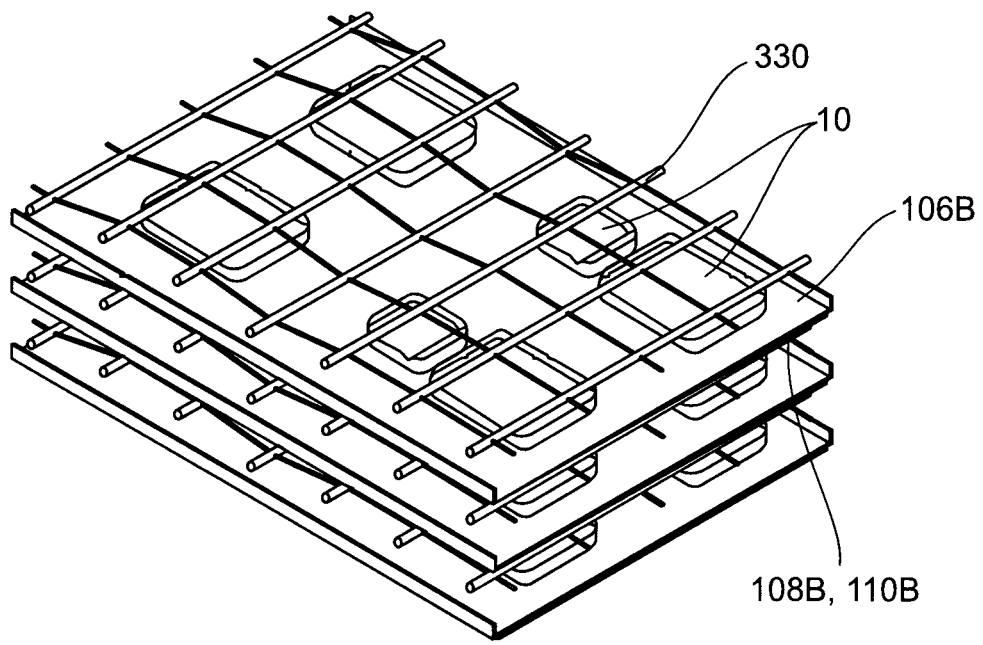
FIGS. 4b and 4c are simplified block diagrams illustrating in a perspective view and a cross-sectional view, respectively, a first implementation of the securing conveyor according to an embodiment of the invention.
Figure 4C:
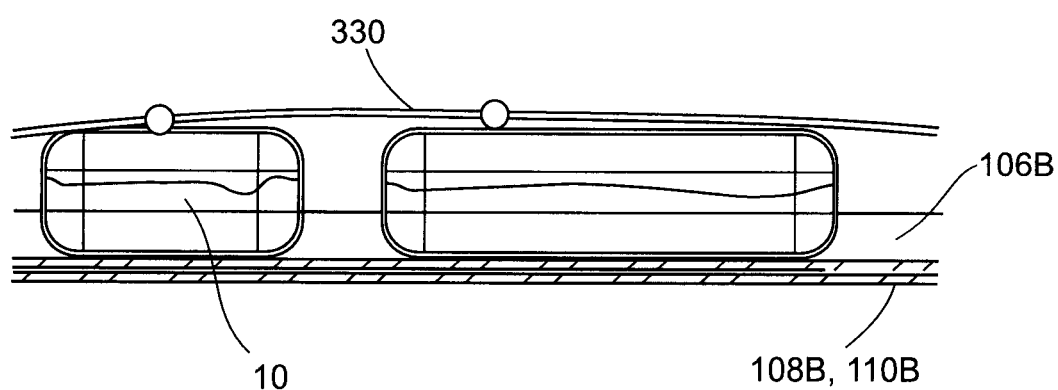
Figure 4D:
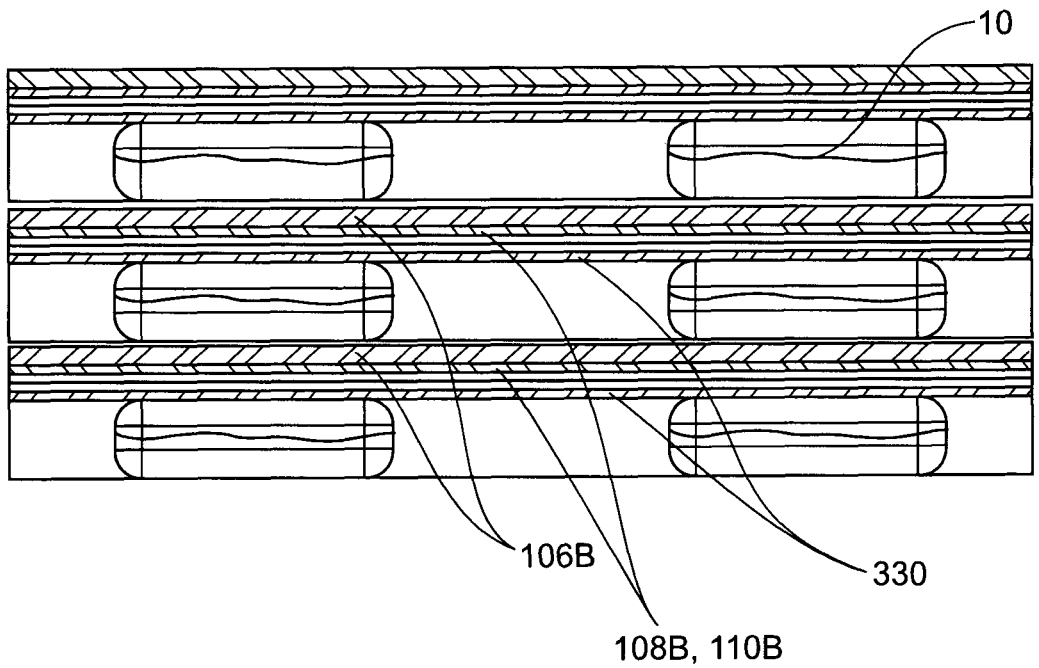
FIGS. 4d to 4f are simplified block diagrams illustrating in two cross-sectional views and a perspective view, respectively, a second implementation of the securing conveyor according to an embodiment of the invention.
Figure 4E:
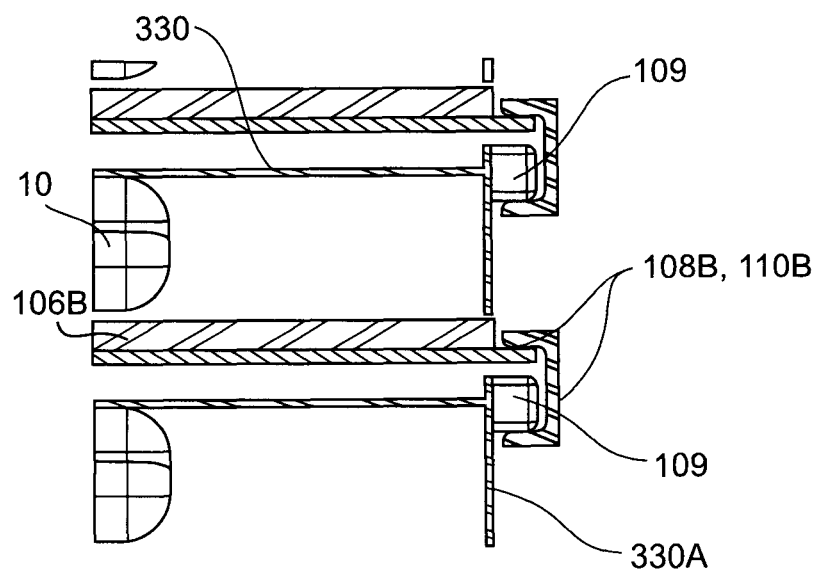
Figure 4F:
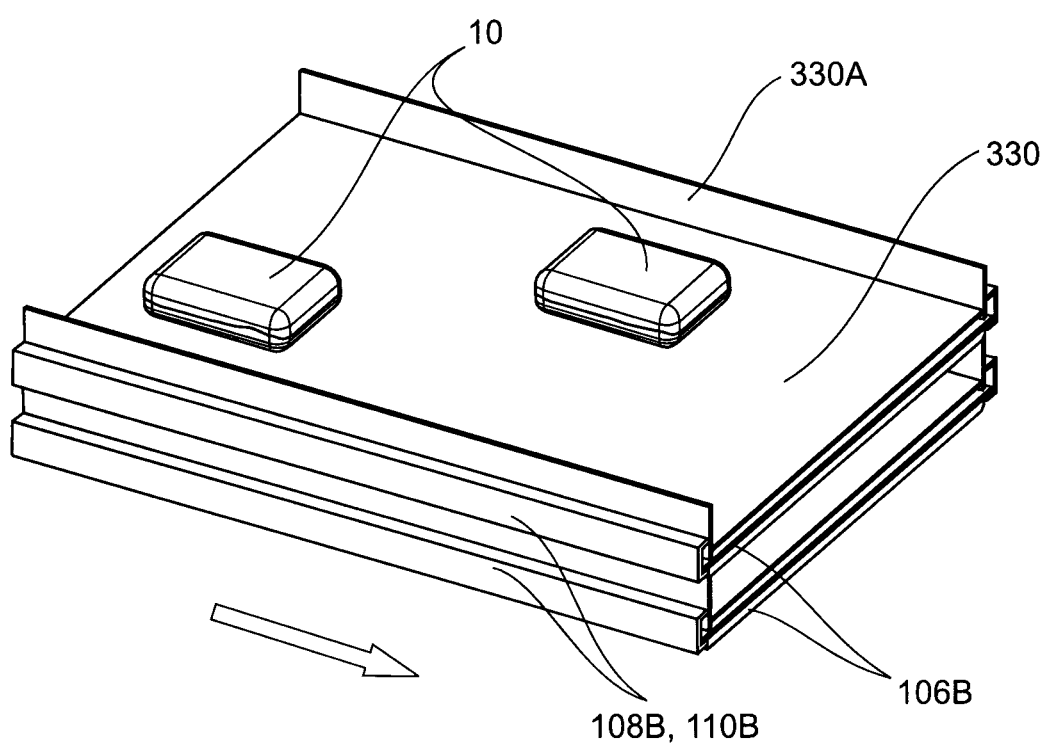

Referring to FIGS. 4a to 4f, the securing mechanism according to the invention comprises a securing conveyor 330 which covers the items before entering the spiral 108 until after leaving the spiral 110, thus securing the items while being immersed in the liquid, as illustrated in FIG. 4a. The securing conveyor 330 comprises, for example, a flexible mesh-like structure made of metal wire having sufficiently small mesh size and sufficient weight to secure the items 10 between the same and the conveyor 106, as illustrated in FIGS. 4b and 4c. Alternatively, the securing conveyor 330 comprises side walls 330A such that the securing conveyor 330 together with the conveyor 106B forms an enclosure containing the items 10 therein, as illustrated in FIGS. 4d to 4f. While immersed in the liquid the items 10 experience buoyancy bringing them in contact with the securing conveyor 330 and are conveyed through interaction therewith, as indicated by the block arrow in FIG. 4f. It is noted that the diagram of FIG. 4f is upside down for better illustration.

Figure 4G:
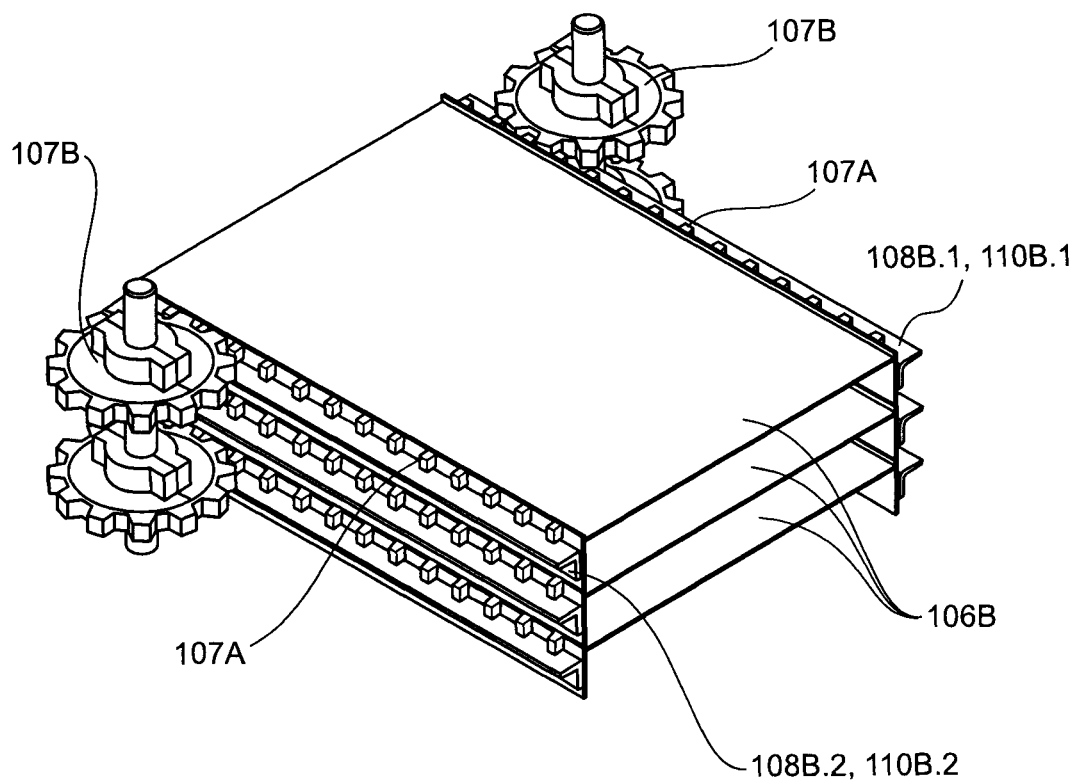
FIGS. 4g to 4j are simplified block diagrams illustrating in perspective and cross-sectional views, a securing mechanism according to an embodiment of the invention.
Figure 4H:
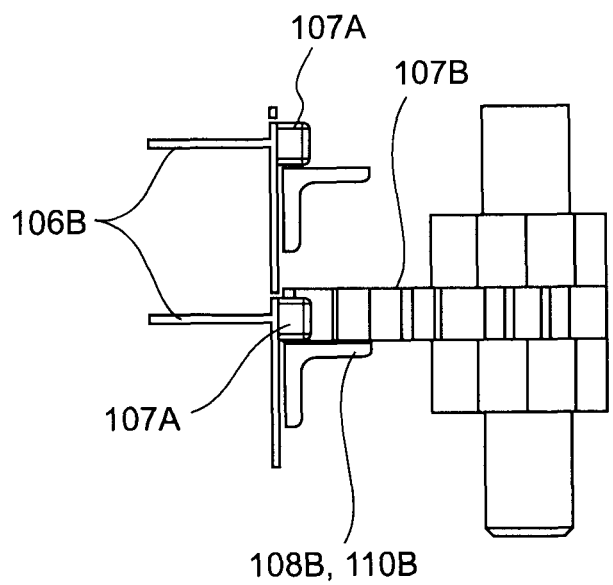

Referring to FIGS. 4g to 4j, the securing mechanism according to the invention comprises a non-self-stacking conveyor 106B with the downward oriented sidewalls forming an enclosure containing the items 10 therein when stacked upon each other in the spirals 108, 110. The support structure 108B, 110B comprises an inside support framework 108B.1, 110B.1 that carries the conveyor 106B at the inside edge and an outside support framework 108B.2, 110B.2 that carries the conveyor 106B at the outside edge. There is no support structure between the inside support framework 108B.1, 110B.1 and the outside support framework 108B.2, 110B.2. Because of this fixed support structure on the inside edge, a rotating center drum cannot be used to drive the conveyor 106B. Here the drive mechanism comprises, for example, a sprocket-type drive mechanism comprising sprocket wheels 107B interacting with respective sprockets 107A disposed on one or both outside edges of the conveyor 106B, as illustrated in FIGS. 4g and 4h.

Figure 4I:
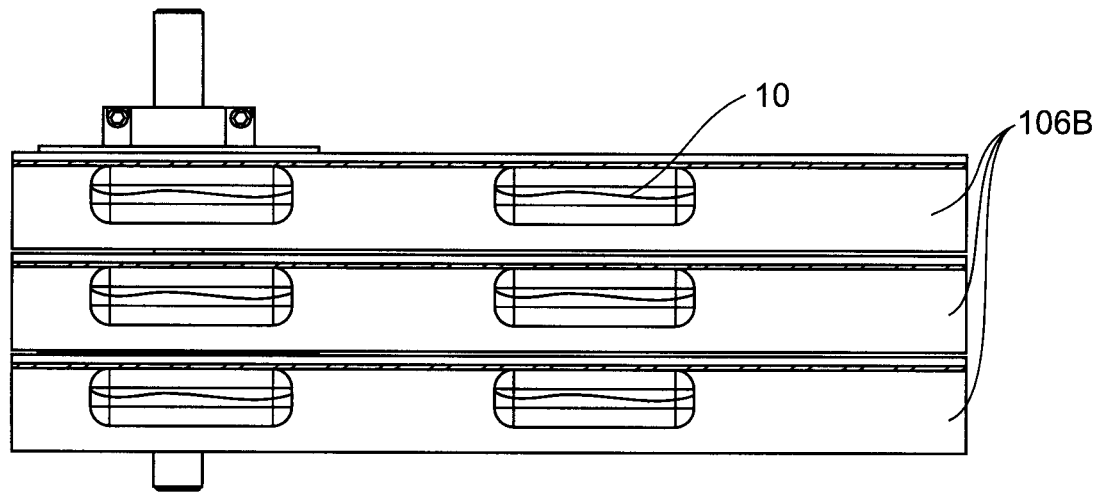
Figure 4J:
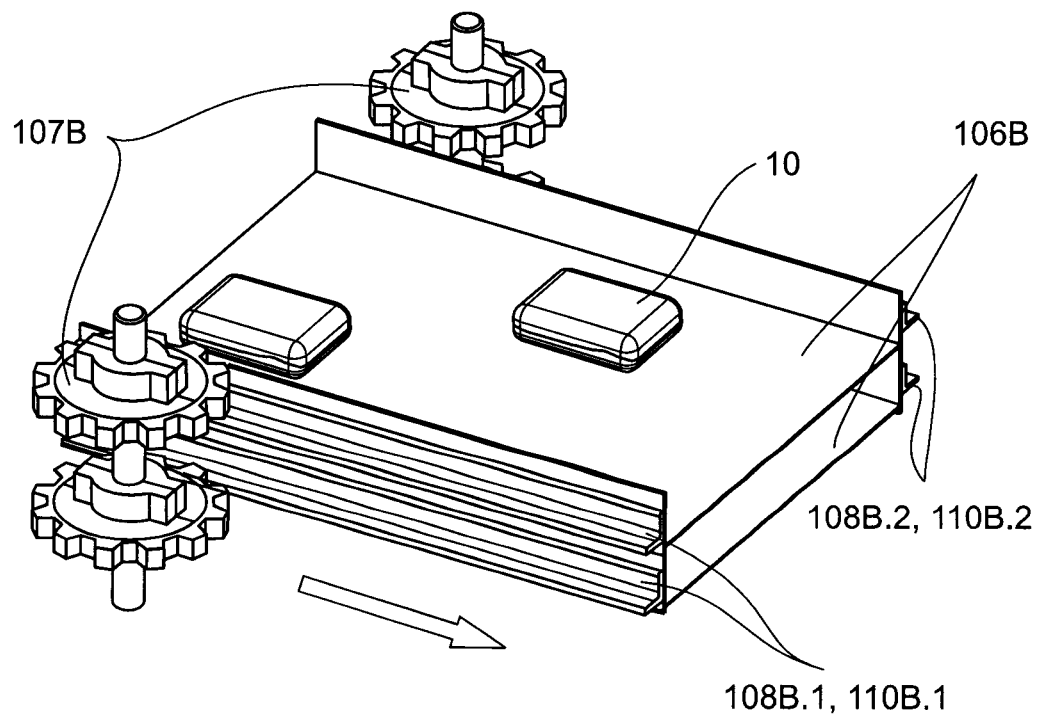

While immersed in the liquid the items 10 placed on the top side of the conveyor 106B experience buoyancy such that they are in contact with the bottom side of the conveyor section stacked thereon, as illustrated in FIG. 4i and are conveyed through interaction therewith, as indicated by the block arrow in FIG. 4j. It is noted that the diagram of FIG. 4j is upside down for better illustration. The items 10 may still get displaced within the enclosure due to the buoyancy and/or current of the liquid. To prevent displacement of the items 10 the conveyor 106B and the support structure 108B, 110B may be designed such that the enclosure has a height to provide a snug fit for the item 10. Optionally, the top and the bottom side of the conveyor 106B may have pads made of a material with a friction grip disposed thereon. Unfortunately, application is limited to items of a predetermined size.

Figure 5A:
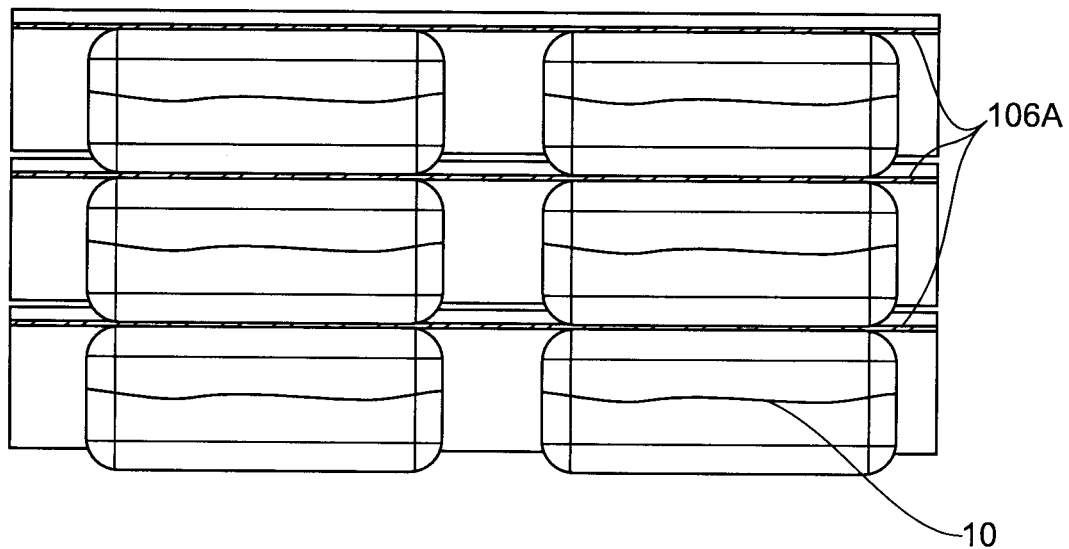
FIGS. 5a and 5b are simplified block diagrams illustrating in a cross-sectional view and a perspective view, respectively, a securing mechanism according to an embodiment of the invention.
Figure 5B:
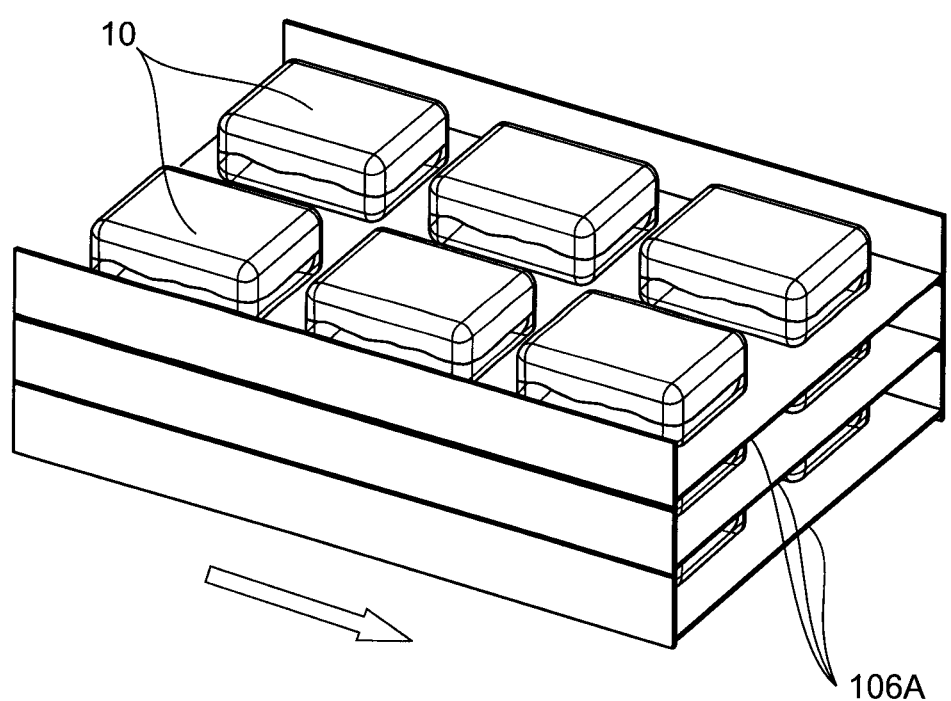

Referring to FIGS. 5a to 5f, the securing mechanism according to the invention comprises a self-stacking conveyor 106A with the downward oriented sidewalls forming an enclosure containing the items 10 therein when stacked upon each other in the spirals 108, 110. While immersed in the liquid the items 10 placed on the top side of the conveyor 106A experience buoyancy such that they are in contact with the bottom side of the conveyor section stacked thereon, as illustrated in FIG. 5a and are conveyed through interaction therewith, as indicated by the block arrow in FIG. 5b. It is noted that the diagram of FIG. 5b is upside down for better illustration. The items 10 may still get displaced within the enclosure due to the buoyancy and/or current of the liquid. To prevent displacement of the items 10 the sidewalls may be designed such that the enclosure has a height to provide a snug fit for the item 10, as illustrated in FIG. 5a. Optionally, the top and the bottom side of the conveyor 106 may have pads made of a material with a friction grip disposed thereon. Unfortunately, application is limited to items of a predetermined size. It is noted that a self-stacking conveyor 106A with upward oriented sidewalls may also be employed.

Figure 5C:
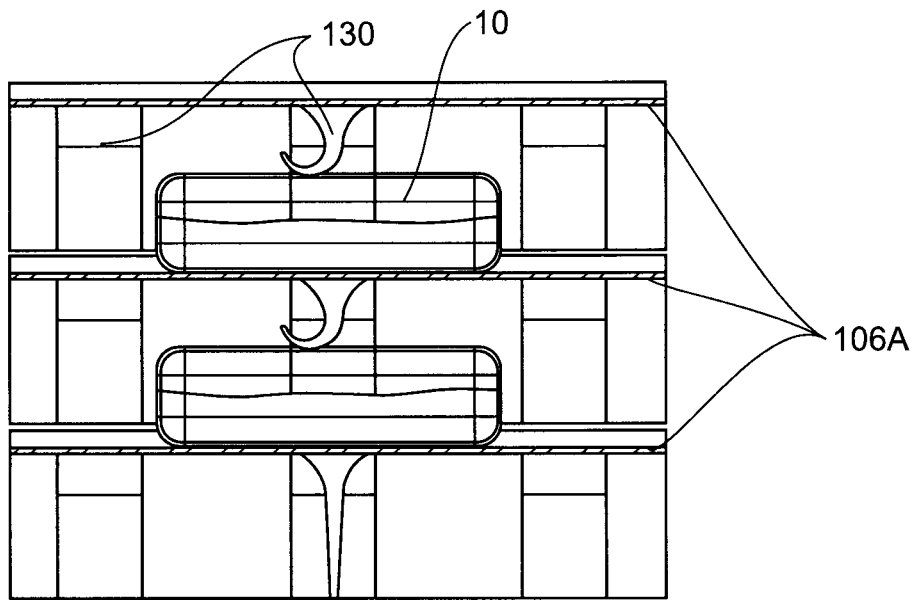
FIGS. 5c and 5d are simplified block diagrams illustrating in a cross-sectional view and a perspective view, respectively, a securing mechanism according to another embodiment of the invention.
Figure 5D:
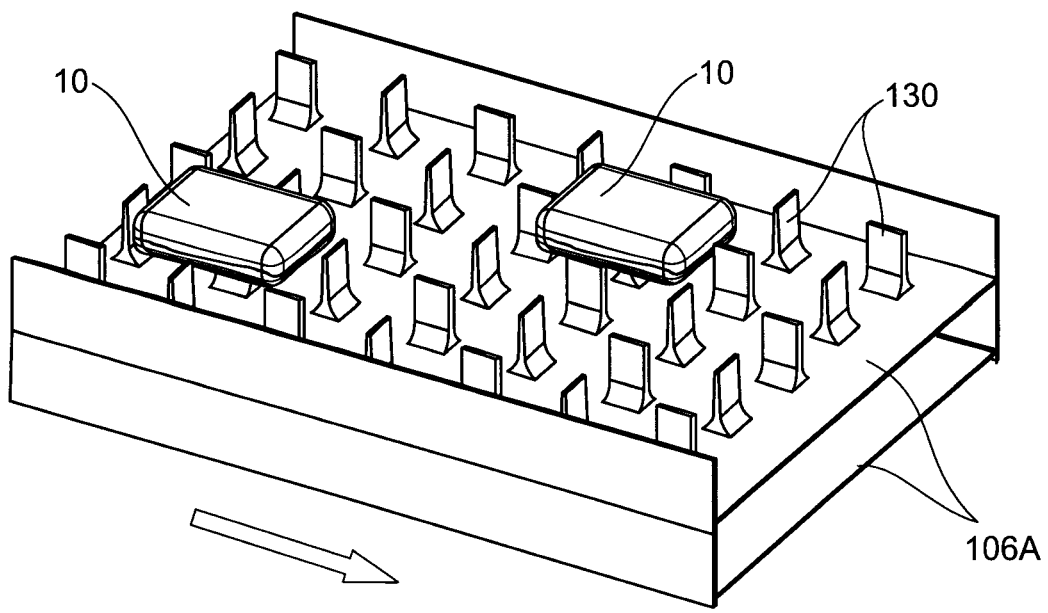
Figure 5E:
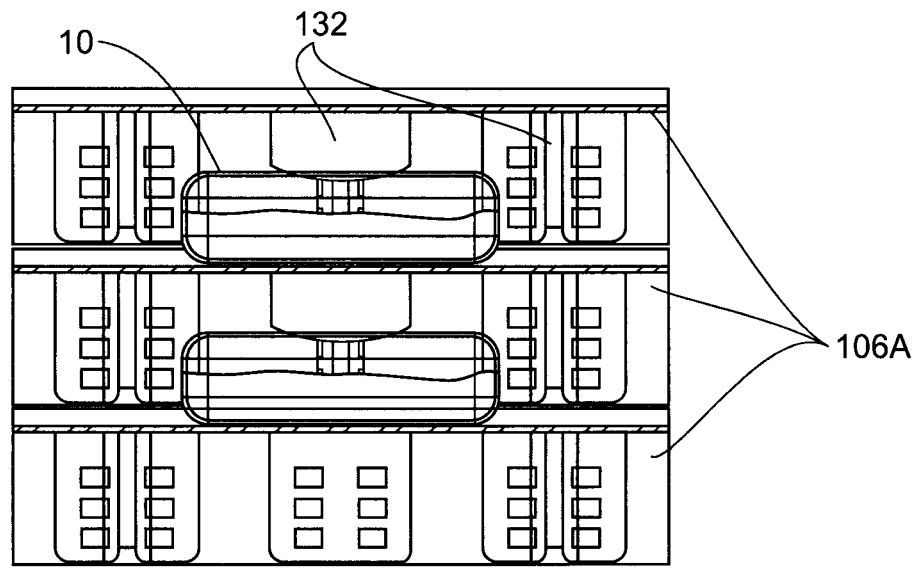
FIGS. 5e and 5f are simplified block diagrams illustrating in a cross-sectional view and a perspective view, respectively, a securing mechanism according to yet another embodiment of the invention.
Figure 5F:
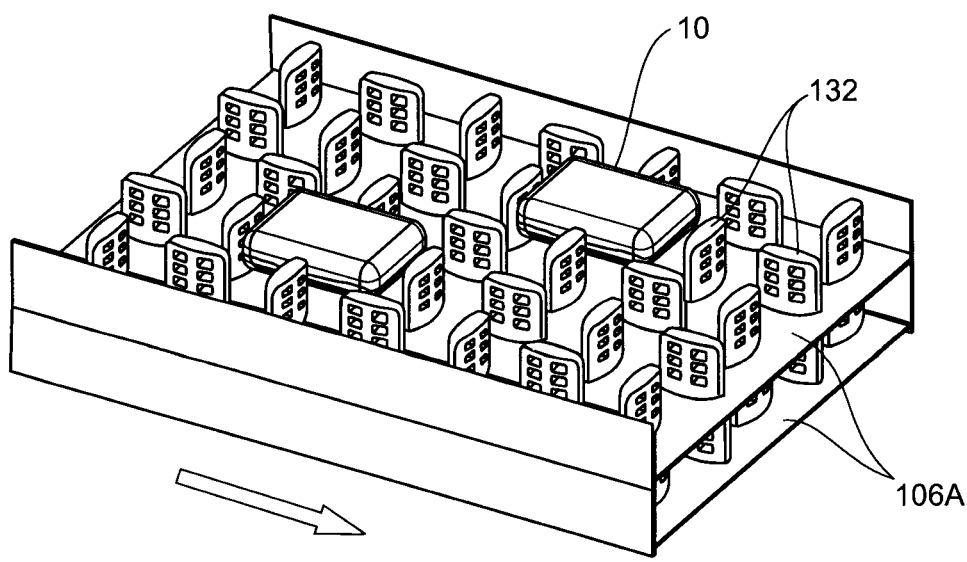

To prevent displacement of the items 10 within the enclosure for items having different size, stalactite-like protrusions 130 are attached to the bottom side of the conveyor 106A, as illustrated in FIGS. 5c and 5d. The protrusions 130 are made of a flexible material—such as for example, rubber—and are sufficiently soft to bend to the contour of the item 10 without damaging the same while being sufficiently firm to hold the item 10 in place. The number of protrusions 130 is determined to be sufficient for securing the items 10 while not interfering with the circulation of the liquid 104. As successive sections of the conveyor come together at the beginning of the spiral, the protrusions coming down onto the items 10 bend and form a spring-like tension producing downward pressure on the product for holding it down on the conveyor 106A. Adjacent protrusions 130 can be oriented perpendicular to each other, as illustrated in FIG. 5d, to form a barrier surrounding the item 10, as illustrated in FIG. 5d. It is noted that the diagram of FIG. 5d is upside down for better illustration. Alternatively, as illustrated in FIGS. 5e and 5f, soft foam protrusions 132 are employed instead of the rubber protrusions 130. It is noted that the protrusions 130, 132 may also be attached to the bottom side of the securing conveyor 330 or the bottom side of non-self-stacking conveyor 106B.

Figure 6A:
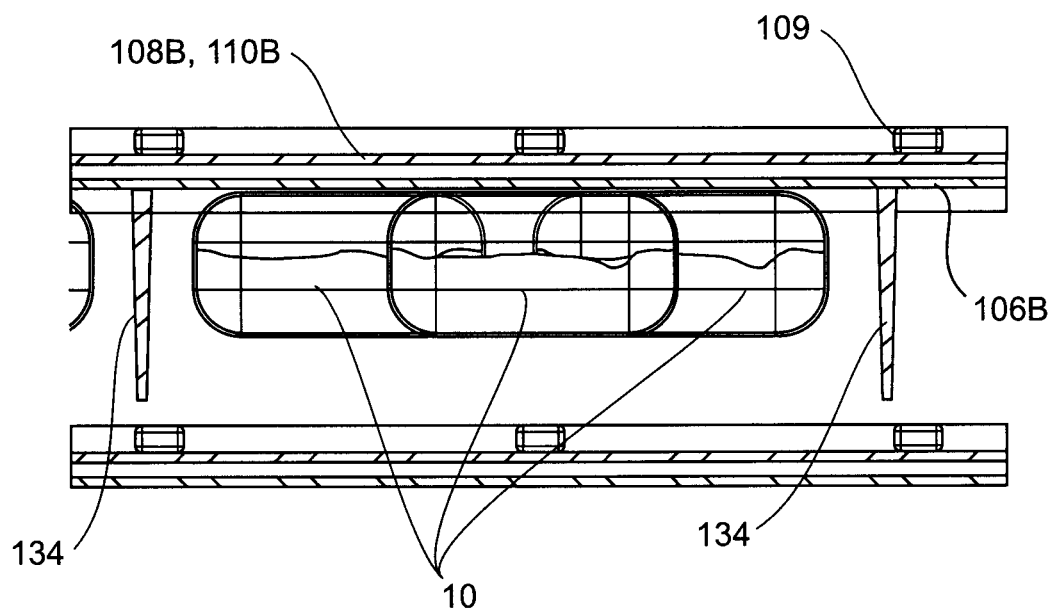
FIGS. 6a to 6c are simplified block diagrams illustrating in a cross-sectional view and two perspective views, respectively, a securing mechanism according to yet another embodiment of the invention.
Figure 6B:
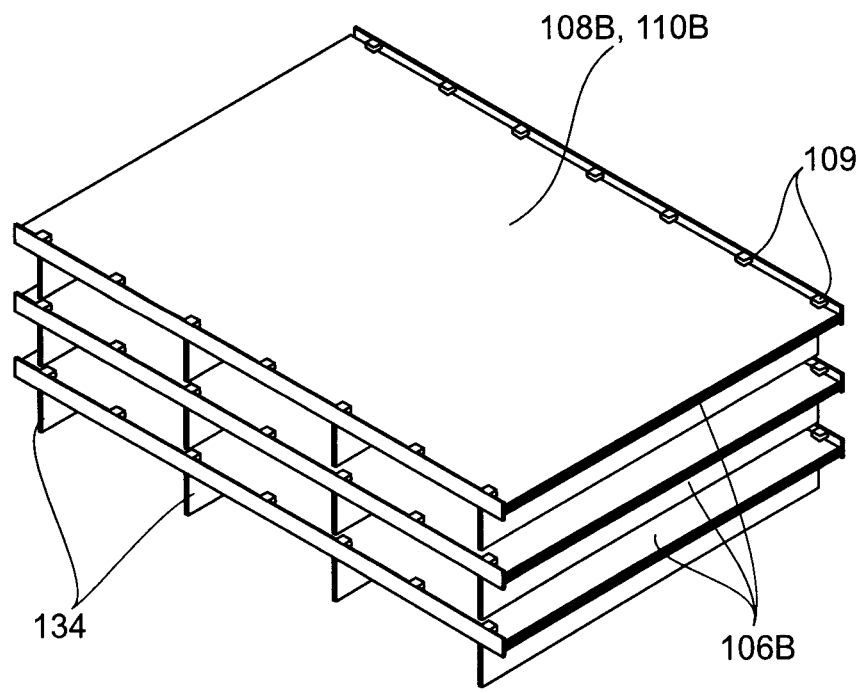
Figure 6C:
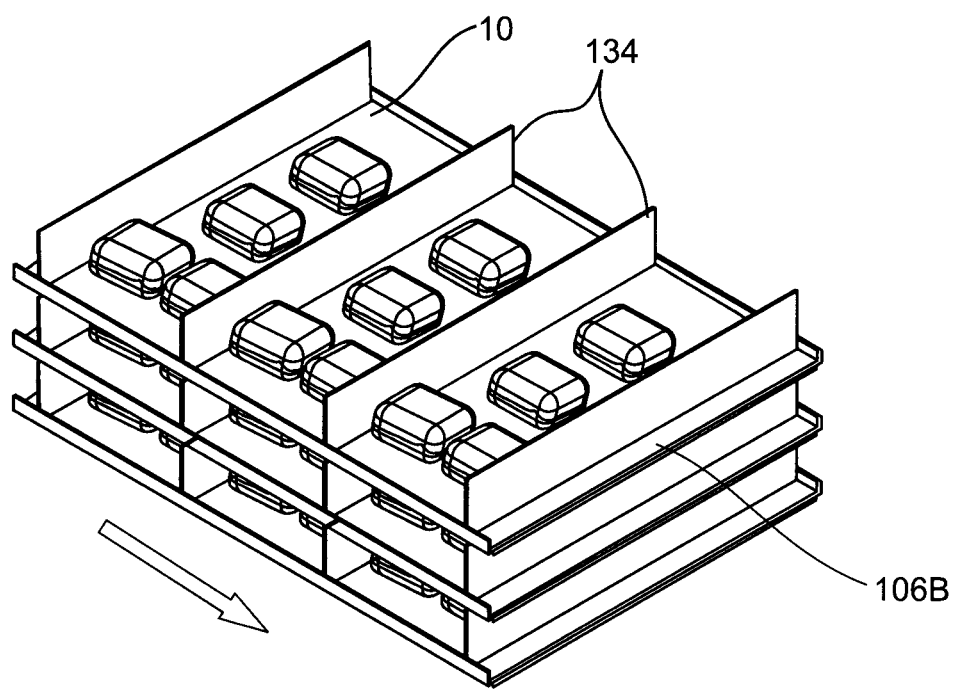
Figure 6D:
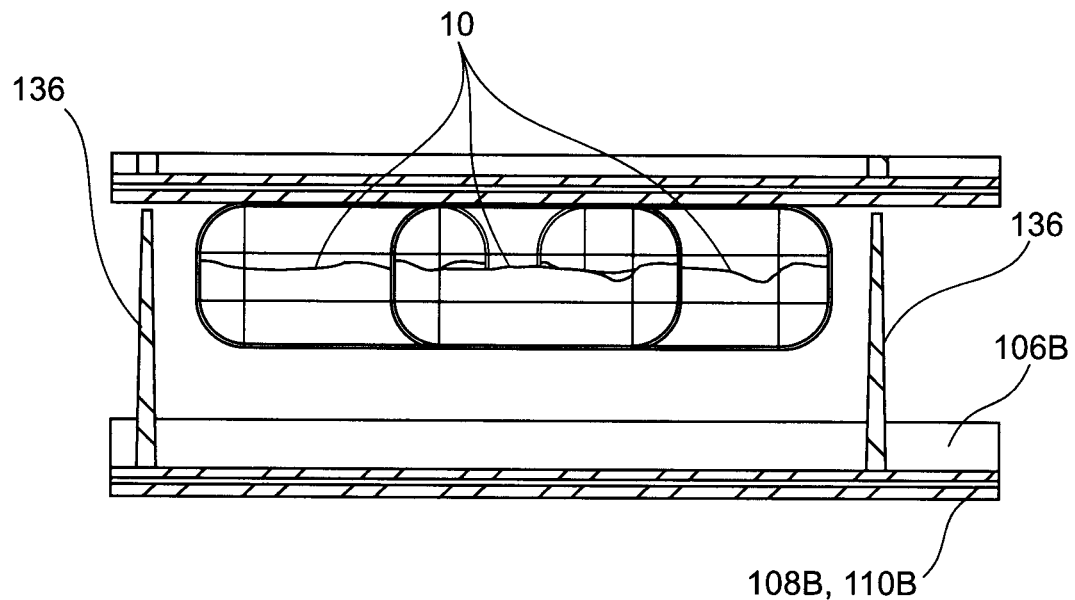
FIGS. 6d and 6e are simplified block diagrams illustrating in a cross-sectional view and a perspective view, respectively, a securing mechanism according to yet another embodiment of the invention.
Figure 6E:
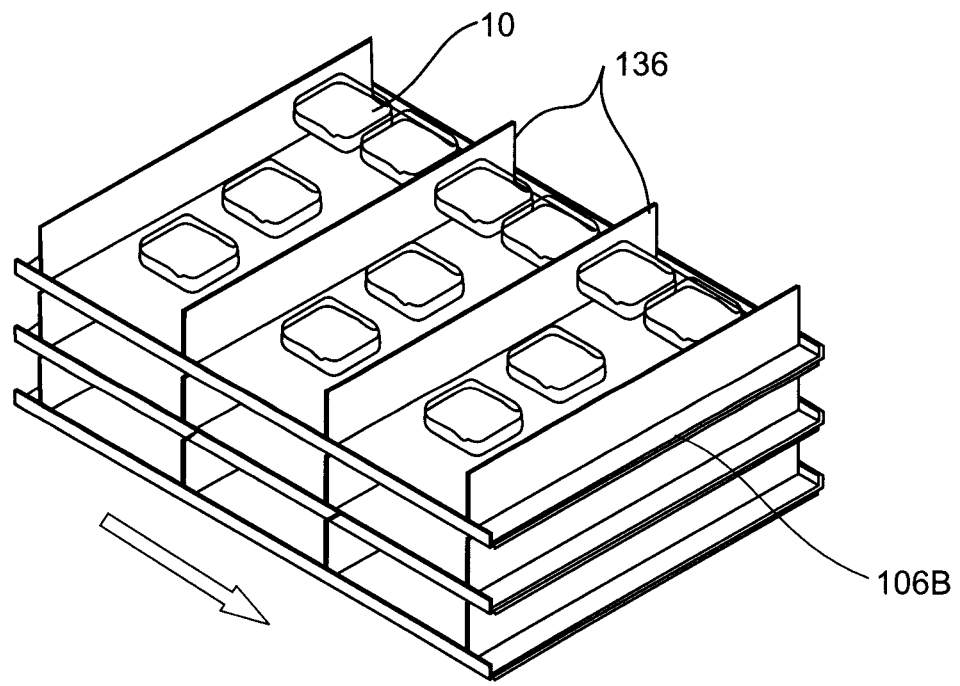

In other embodiments, the displacement of the items 10 is prevented by attaching barriers 134, oriented substantially perpendicular to the direction of movement of the conveyor, to the bottom side of a hanging conveyor 106B with the conveyor 106B being supported by the support structure 108B, 110B via support elements 109, as illustrated in FIGS. 6a to 6c. The barriers 134 catch the items 10 when floating on the liquid 104 at the entry section and convey them between two successive barriers 134, as illustrated in FIG. 6a. It is noted that the diagram of FIG. 6c is upside down for better illustration. Alternatively, barriers 136 may be attached to the top side of the conveyor 106 as illustrated in FIGS. 6d and 6e. The barriers 136 can have sufficient height for securing the floating item 10 between two successive barriers 136. Optionally, the protrusions 130 or 132 may be employed to further prevent displacement of the items 10 between two successive barriers 134, 136. It is noted that conveyor sidewalls have been omitted in FIGS. 6b, 6c, and 6e for clarity.

Figure 7A:
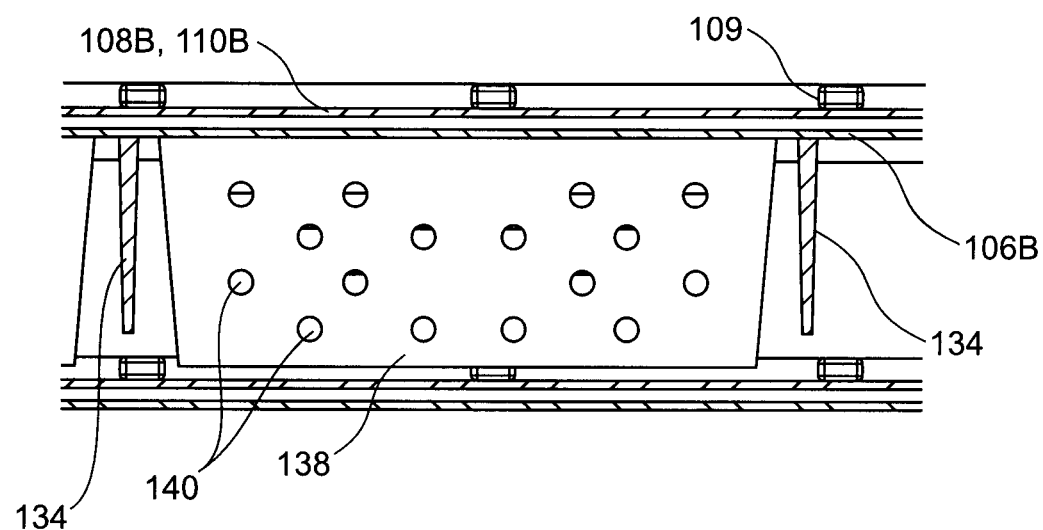
FIGS. 7a and 7b are simplified block diagrams illustrating in a cross-sectional view and a perspective view, respectively, a securing mechanism according to yet another embodiment of the invention.
Figure 7B:
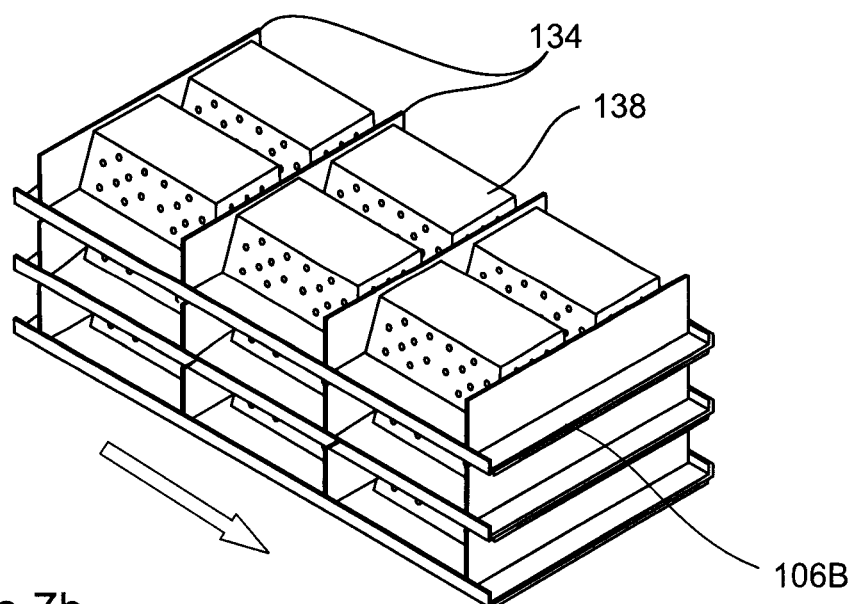
Figure 7C:
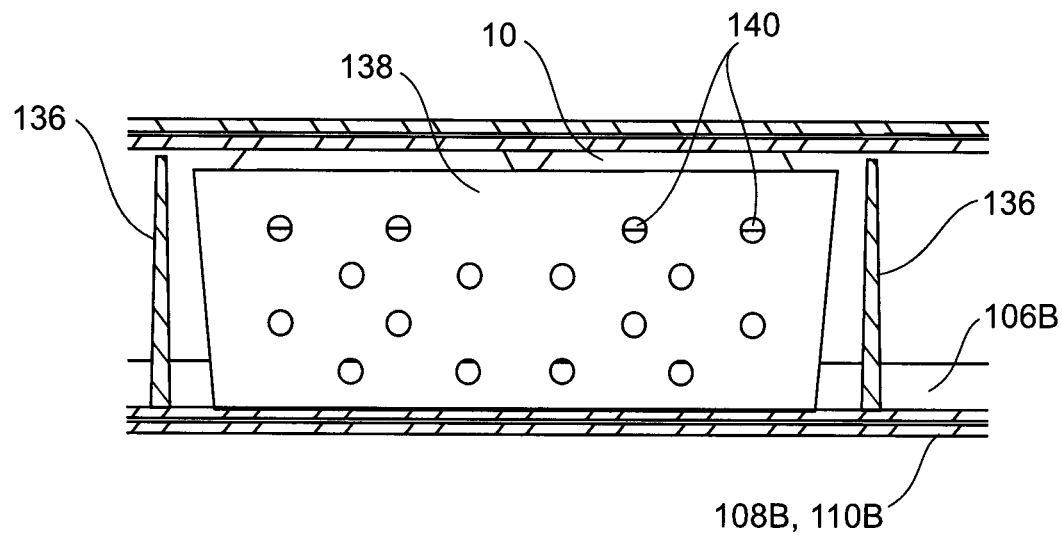
FIGS. 7c and 7d are simplified block diagrams illustrating in a cross-sectional view and a perspective view, respectively, a securing mechanism according to yet another embodiment of the invention.
Figure 7D:
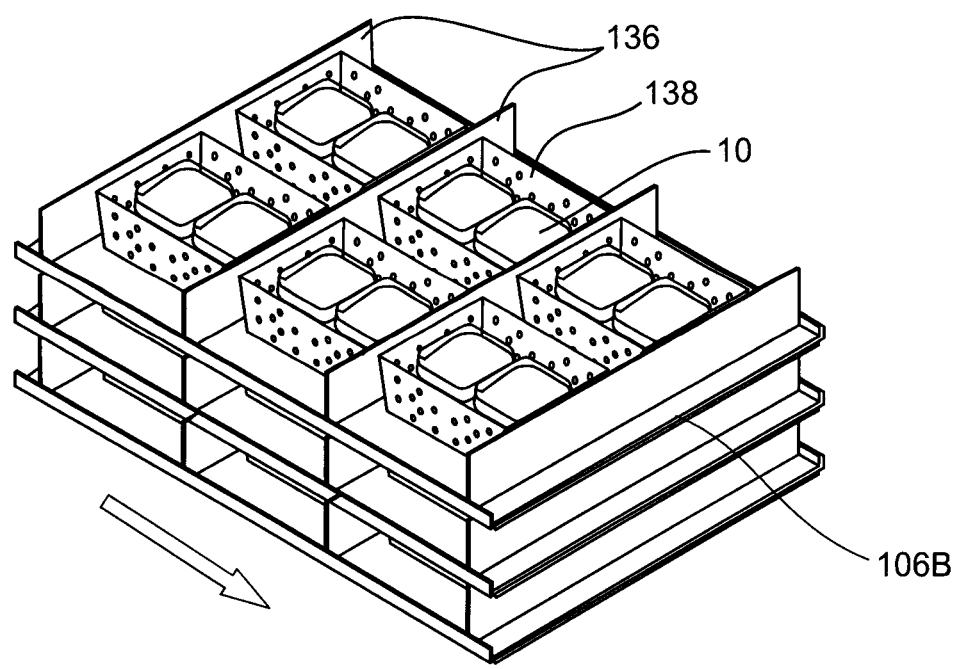

Optionally, trays 138 having the items 10 disposed therein are employed in the above embodiments illustrated in FIGS. 6a to 6c, as illustrated in FIGS. 7a and 7b, and the embodiments illustrated in FIGS. 6d and 6e, as illustrated in FIGS. 7c and 7d. It is noted that the diagram of FIG. 7b is upside down for better illustration. The trays 138 are made of, for example, a plastic material and have apertures 140 disposed in the walls thereof to enable circulation of the liquid 104 therethrough. The trays 138 can be sized such that one tray substantially fits the distance between two successive barriers 134, 136. It is noted that conveyor sidewalls have been omitted in FIGS. 7b and 7d for clarity.

While the securing mechanisms are only illustrated in combination with the spiral conveyor system 100 it will become evident to those skilled in the art that they are not limited thereto but may also be employed with other spiral conveyor systems such as, for example, spiral conveyor systems 200 and 300.

Figure 8A:
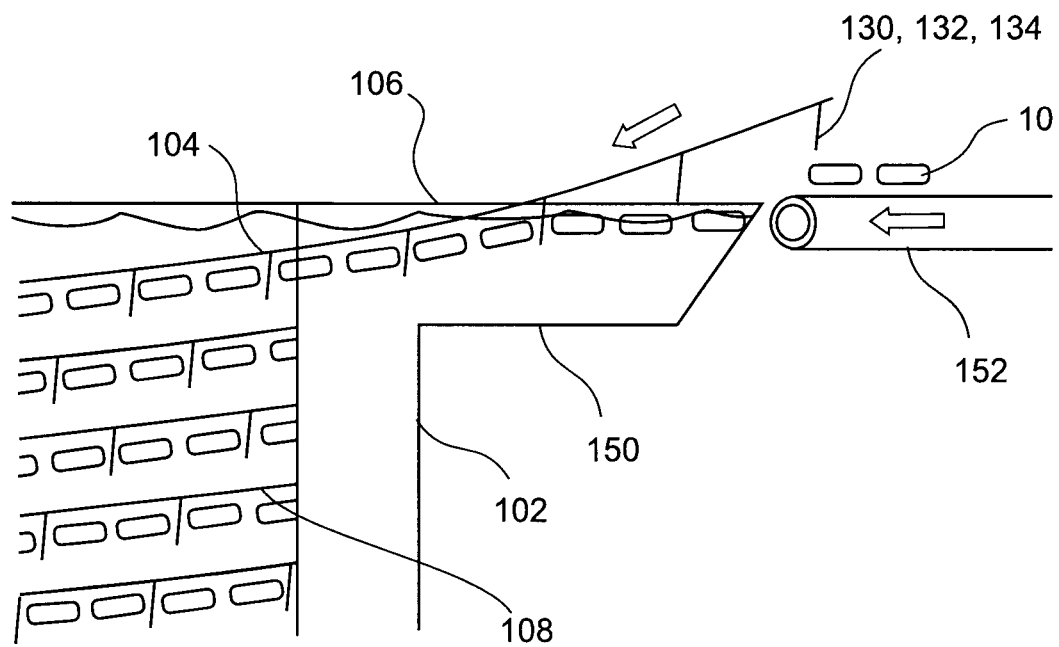
FIGS. 8a and 8b are simplified block diagrams illustrating in cross-sectional views entry and exit of the items using a hanging conveyor according to an embodiment of the invention.
Figure 8B:
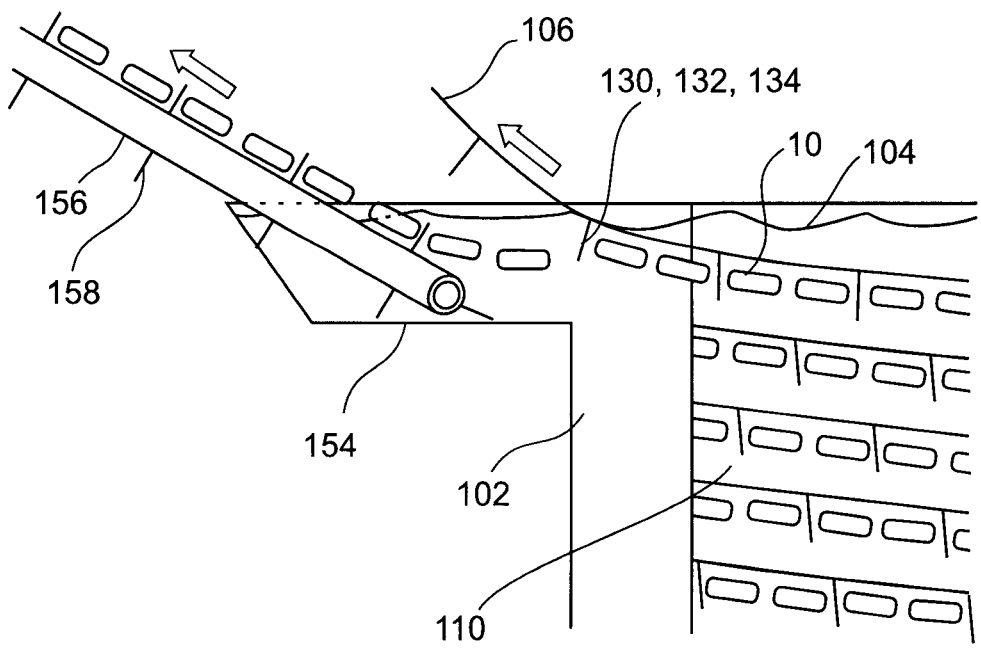

FIGS. 8a and 8b illustrate entry and exit, respectively, of floating items 10 when a hanging conveyor 106 is employed. The items 10 provided via conveyor 152 are placed onto the surface of the liquid 104 at entry section 150 of the tank 102. The floating items are caught by the barriers 134 and/or the protrusions 130, 132 and conveyed to the spiral 108. At the exit, the items 10 are released from the conveyor 106 and float on the surface of the liquid 104 at exit section 154 where they are caught by barriers 158 of exit conveyor 156.

In order to prevent displacement of the items 10 while being conveyed along the cross-over section 106.3 in embodiments where the top of the enclosure is provided by a conveyor section stacked thereupon in the spiral, the cross-over section is provided with a cover or a securing conveyor. Alternatively, air is injected into the liquid 104 below the cross-over section in order to reduce the buoyancy of the items 10. Air may also be injected along other section of the conveyor path through the liquid in order to reduce the buoyancy of the items 10.

Figure 9:
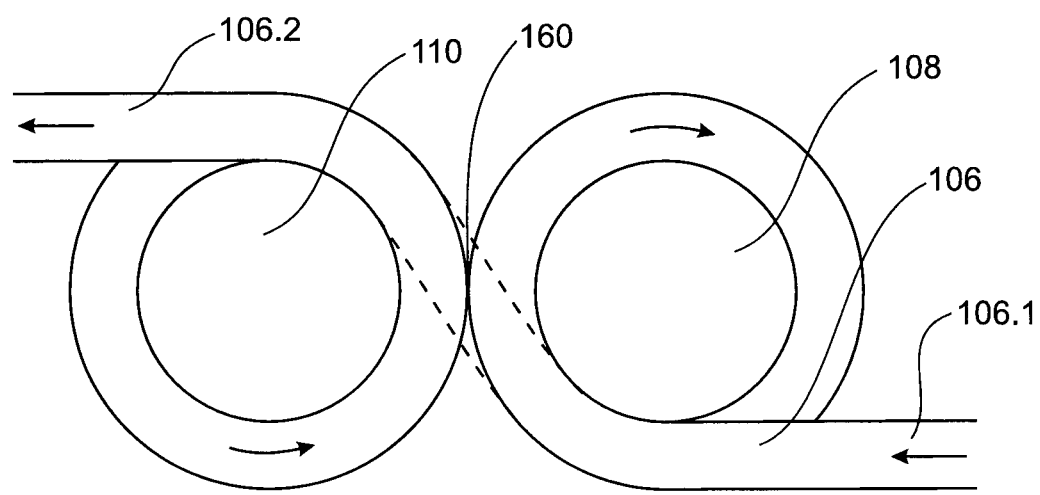
FIG. 9 is a simplified block diagram illustrating in a top view a spiral conveyor system for immersing items in a liquid according to another embodiment of the invention.

Further alternatively, the spirals 108 and 110 are placed in close proximity to each other, as illustrated in FIG. 9. At the location of the closest proximity the conveyor crosses at cross-over 160 from the spiral 108 to the spiral 110 with the conveyor rotating in the spiral 110 in opposite direction to the spiral 108, as indicated by the arrows, thus obviating employment of the above means for preventing the displacement of the items 10 during the cross-over.

Figure 10A:
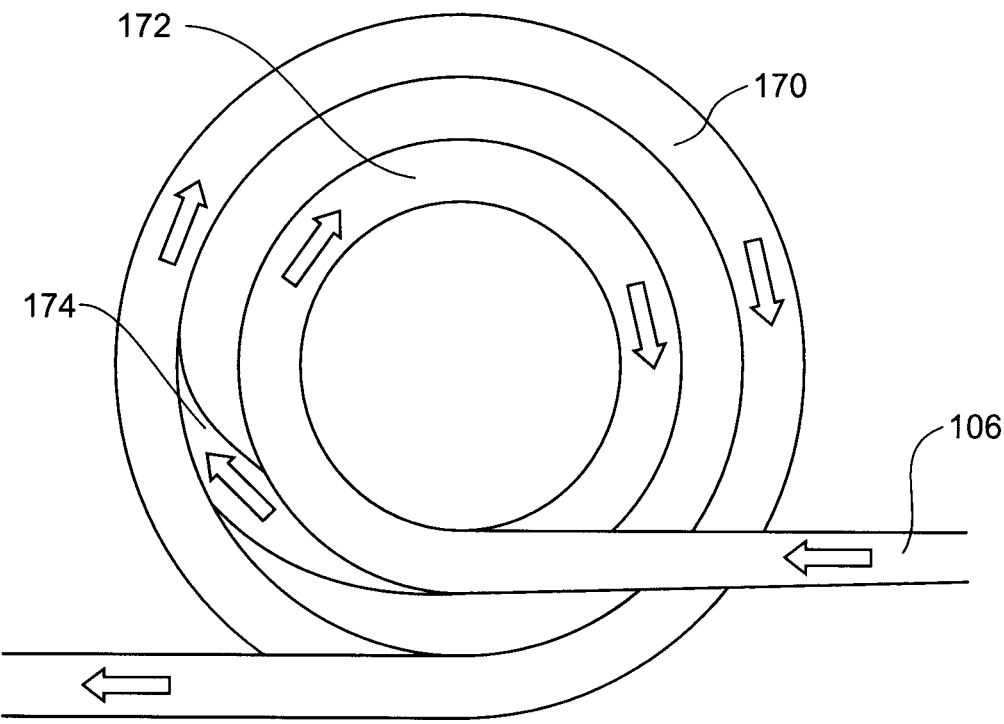
FIGS. 10a and 10b are simplified block diagrams illustrating in a top view and a cross-sectional view, respectively, a spiral conveyor system for immersing items in a liquid according to yet another embodiment of the invention.
Figure 10B:
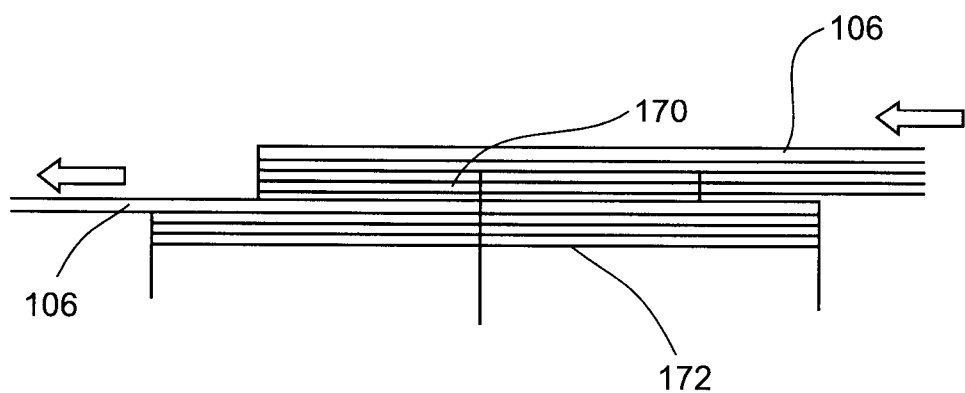

In order to provide an increased path length of the conveyor 106 inside the tank while minimizing the size of the tank containing the liquid, two spirals 170 and 172 may be provided in a nested fashion, as illustrated in FIGS. 10a and 10b. For example, the conveyor 106 is moved downward via the inner spiral 172, crossed over via cross-over section 174 to the outer spiral 170 and moved upward therewith, as indicated by the block arrows. To minimize the cross-over section the outside diameter of the inner spiral 172 may be approximately equal to the inside diameter of the outer spiral 170. Alternatively, the spirals may be placed in a non-concentric fashion with the cross-over placed the location of closest proximity of the spirals 170, 172.

Alternatively each of the spirals 108, 110 may be implemented using a twin drum set having the conveyor 106 spiral around both drums at the same time. Further alternatively, the spiral support structure is adapted for moving the conveyor 106 down and up a same spiral with adjacent stacked spiral sections moving in opposite direction.

It is noted that conventional twin conveyor designs for air cooling/heating the items 10 may be adapted for use with liquid cooling/heating the items 10 according to the invention by placing the items 10 only onto the lower conveyor and using the upper conveyor for securing the same.

Referring to FIGS. 11*a* to 11*i*, a spiral conveyor system for immersing items in a liquid 400 according to a fourth embodiment of the invention is provided. In the spiral conveyor system 400 the items 10 are secured to the conveyor 406 by generating a substantially downward oriented flow of the liquid 104 through the conveyor 406, as indicated by the block arrows in FIG. 11*a*, thus gently pressing the items 10 onto the conveyor 406.

The spiral conveyor system 400 can comprise spiral guiding structure 408 rotatable mounted to tank 402 via drive shaft 408A connected to drive 408B for guiding/moving the conveyor 406 from entry section 406.1 in a downward direction to cross-over section 406.3 and spiral guiding structure 410 rotatable mounted to tank 402 via drive shaft 410A connected to drive 410B for guiding/moving the conveyor 406 in an upward direction from the cross-over section 406.3 to exit section 406.2.

Referring to FIGS. 11*b* and 11*c*, the conveyor 406 comprises conveyor bottom 406A—supported by guide rails 432 of the respective spiral guiding structure 408, 410—and walls 406B. The conveyor bottom 406A can comprise a lattice structure—made of, for example, metal such as stainless steel, or plastic such as nylon—for supporting the items 10 placed thereupon while also providing sufficient open area 438 for allowing sufficient liquid flow therethrough. Other structures may be employed as long as sufficient open area 438 can be provided. The waterflow is guided in the downward direction by placing the conveyor 406 between cylindrical walls 434, 436 surrounding the same in close proximity, with the wall 436 mounted to the respective spiral guiding structure 408, 410 and the wall 434 mounted to the tank 402.

Alternatively, the walls 406B of the conveyor 406 are overlapping solid plates and have sufficient height for guiding the liquid flow, or the walls 406B of a self-stacking conveyor are overlapping solid plates, as illustrated in FIG. 11*d*.

Further alternatively, baffles 440 are placed in proximity to the conveyor 406, as illustrated in FIG. 11*e*. For example, the baffles 440 comprise flat plates placed around the conveyor 406 or ring structures surrounding the conveyor 406. The baffles 440 are oriented downwardly substantially vertical or angled towards the conveyor 406.

It is noted that walls or baffles may also be placed in proximity to the conveyor 406 at the cross-over section 406.3.

Figure 11A:
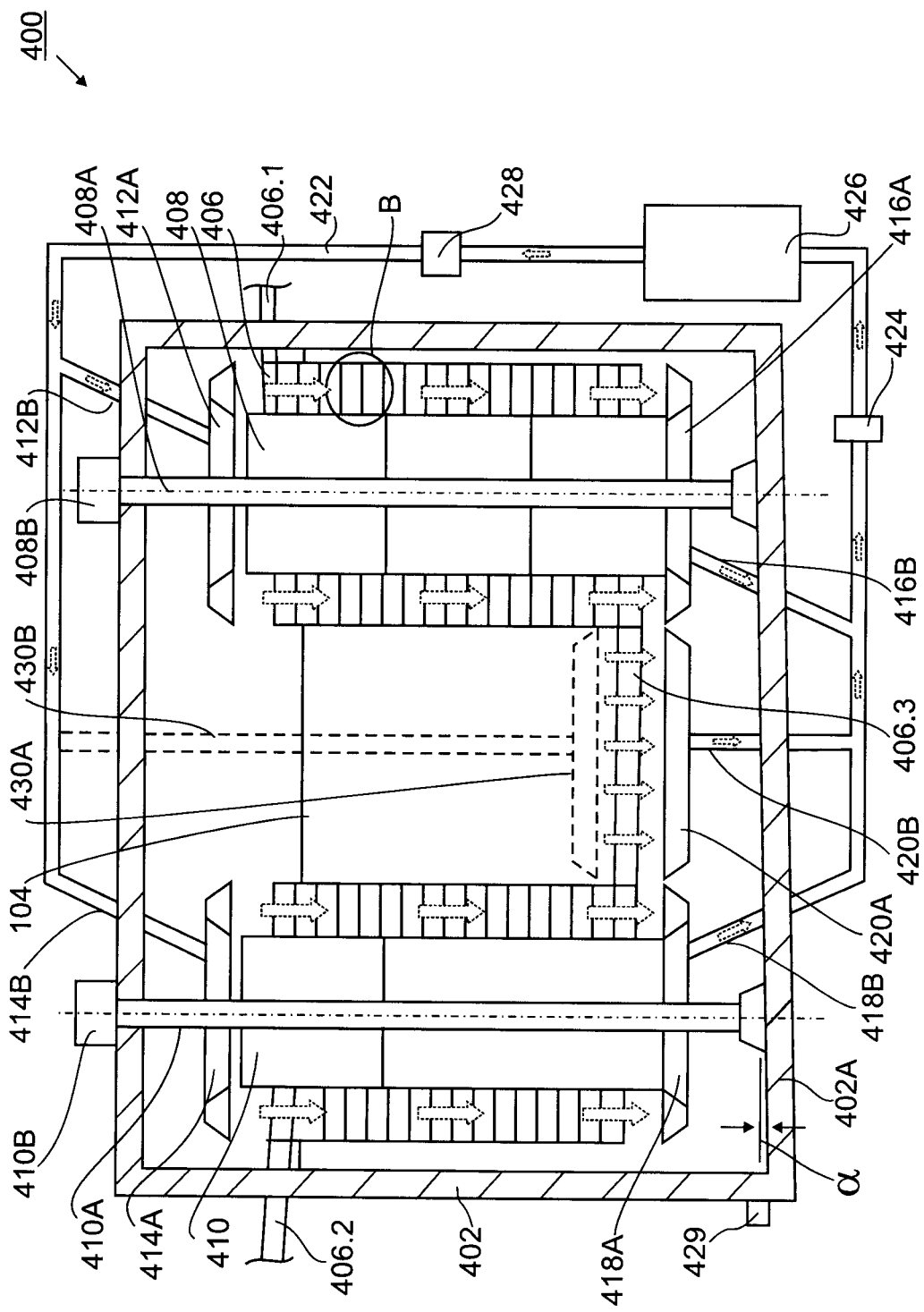
FIG. 11a is a simplified block diagram illustrating in a cross-sectional view a spiral conveyor system for immersing items in a liquid according to a fourth embodiment of the invention.
Figure 11F:
FIGS. 11f and 11g are simplified block diagrams illustrating in a cross-sectional view and a bottom view, respectively, a liquid input annulus of the spiral conveyor system for immersing items in a liquid according to the fourth embodiment of the invention; and, FIGS. 11h and 11i are simplified block diagrams illustrating in a cross-sectional view and a top view, respectively, a liquid output annulus of the spiral conveyor system for immersing items in a liquid according to the fourth embodiment of the invention.
Figure 11G:
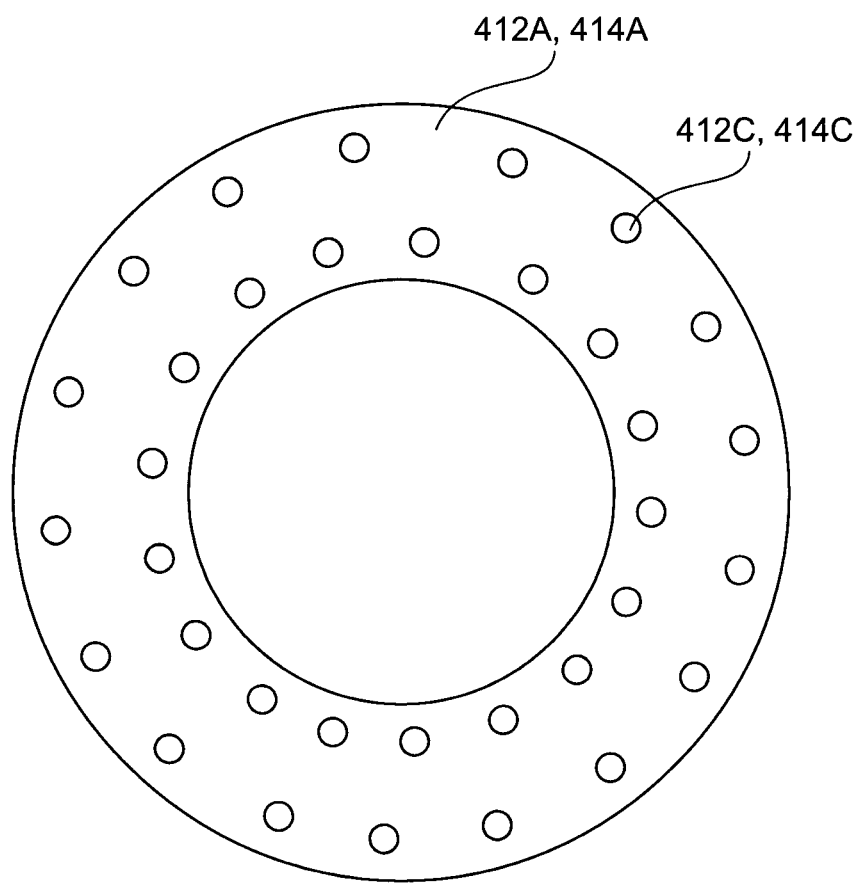

The substantially downward oriented flow of the liquid 104 through the conveyor 406 is generated using a liquid input structure placed above the conveyor for providing the liquid 104 and a liquid output structure placed below the conveyor in close proximity thereto for removing the liquid 104. The liquid input structure comprises, for example, liquid input annulus 412A placed above the conveyor 406 surrounding the spiral guiding structure 408 and liquid input annulus 414A placed above the conveyor 406 surrounding the spiral guiding structure 410. The liquid input annuli 412A, 414A are designed to receive the liquid 104 from respective liquid input conduits 412B, 414B and to provide via a plurality of openings 412C, 414C a liquid flow that is substantially equally distributed over the respective annulus formed by the conveyor surrounding the spiral guiding structures 408, 410, as illustrated in FIGS. 11*a*, 11*f*, and 11*g*.

Figure 11H:
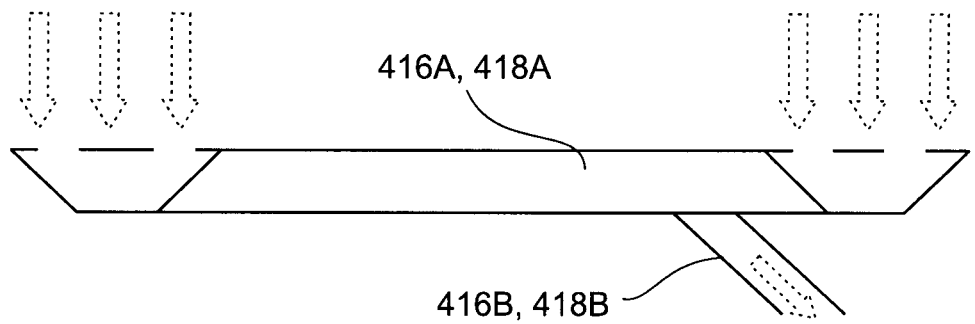
FIGS. 11b and 11c are simplified block diagrams illustrating in a cross-sectional view and a top view, respectively, a detail of the spiral conveyor system for immersing items in a liquid according to the fourth embodiment of the invention.
FIGS. 11d and 11e are simplified block diagrams illustrating in cross-sectional views other designs of the detail of the spiral conveyor system for immersing items in a liquid according to the fourth embodiment of the invention.
Figure 11I:
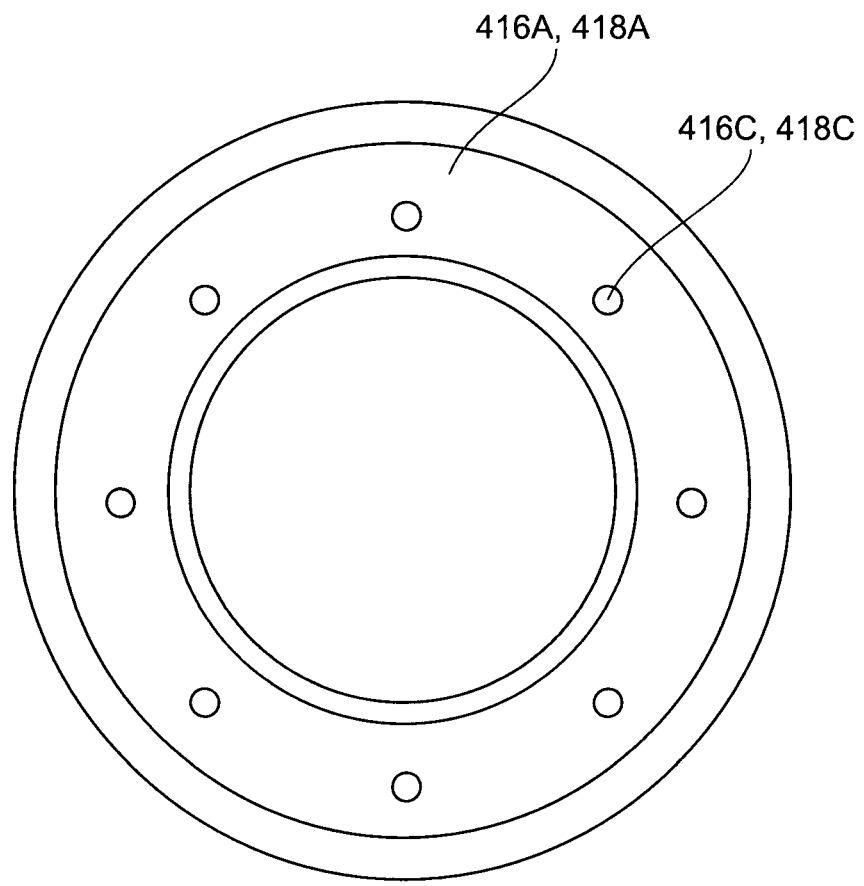

The liquid output structure comprises, for example, liquid output annulus 416A placed below the conveyor 406 surrounding the spiral guiding structure 408 and liquid output annulus 418A placed below the conveyor 406 surrounding the spiral guiding structure 410. The liquid output annuli 412A, 414A are designed to remove the liquid 104 in a substantially equally distributed manner covering the respective annulus formed by the conveyor 406 surrounding the spiral guiding structures 408, 410 via a plurality of suction openings 416C, 418C and to provide the removed liquid to respective liquid output conduits 416B, 418B, as illustrated in FIGS. 11*a*, 11*h*, and 11*i*.

Cross-over liquid output 420A connected to liquid output conduit 420B is placed below the conveyor 406 at cross-over section 406.3 for removing the liquid 104 from below the conveyor 406 in order to secure the items 10, in one case spanning the entire length of the cross-over section 406.3. Optionally, cross-over liquid input 430A connected to liquid input conduit 430B is placed above the conveyor 406 at cross-over section 406.3, as indicated by the dashed lines in FIG. 11*a*.

The liquid flow is determined to be strong enough for sufficiently pressing the items 10 onto the conveyor 406 while being gentle enough to not dislodge the items 10 from the conveyor 406. The liquid flows downward through the conveyor 406 stack due to the weight of the incoming liquid above and drawn by the suction from the outflow.

The liquid output annuli 416A, 418A and the cross-over liquid output 420A can be placed a predetermined distance above a bottom wall of the tank 402 to prevent debris and particulates accumulated at the bottom of the tank 402 from being sucked into the output conduits 416B, 418B, and 420B. The bottom wall 402A of the tank 402 can be sloped at an angle $\alpha$ towards drain port 429, allowing draining of the debris and particulates accumulated at the bottom of the tank 402.

The spiral conveyor system 400 comprises a liquid return connecting the liquid output conduits 416B, 418B, and 420B with the liquid input conduits 412B, 414B, and (optionally) 430B. The liquid return comprises a liquid heating/cooling apparatus 426 such as, for example, a heat exchanger containing a heat source or cooling source such as hot water, steam, ammonia, $CO_2$, Freon for adjusting the temperature of the liquid 104, a pump 428 for pumping the water to the liquid input conduits, and flow control valve 424 for controlling the liquid flow.

The present invention has been described herein with regard to certain embodiments. However, it will be obvious to persons skilled in the art that a number of variations and modifications can be made without departing from the scope of the invention as described herein.

What is claimed is:
1. A spiral conveyor system comprising:
 a tank for containing a liquid at a predetermined temperature therein;
 a conveyor for conveying items through the liquid; and,
 a guiding structure disposed in the tank for guiding the conveyor in a spiral-type fashion wherein the conveyor comprises side walls such that the same form an enclosure in concert with a top surface of a conveyor section and a bottom surface of a conveyor section placed thereabove for securing the items therein while being conveyed through the liquid and wherein the guiding structure comprises:
a first spiral for guiding the conveyor in a downward direction;
a second spiral for guiding the conveyor in an upward direction; and,
a cross-over section for guiding the conveyor from the first spiral to the second spiral.

2. The spiral conveyor system according to claim 1 wherein the conveyor comprises protrusions for holding the items, the protrusions facing downward from the bottom surface of the conveyor.

3. The spiral conveyor system according to claim 1 wherein the conveyor comprises barriers placed along the same for securing the items between two successive barriers, the barriers facing upward from the top surface of the conveyor and being placed along the conveyor having a predetermined distance between two successive barriers and being oriented substantially perpendicular to a direction of movement of the conveyor; or,
wherein the conveyor comprises barriers placed along the same for securing the items between two successive barriers, the barriers facing downward from the bottom surface of the conveyor and being placed along the conveyor having a predetermined distance between two successive barriers and being oriented substantially perpendicular to a direction of movement of the conveyor.

4. The spiral conveyor system according to claim 3 comprising trays for containing the items therein, each tray being adapted to substantially fit the distance between two successive barriers.

5. The spiral conveyor system according to claim 1 wherein the conveyor comprises sprockets disposed on at least one side thereof, the sprockets being adapted for interacting with sprocket wheels of a sprocket-type drive mechanism.

6. The spiral conveyor system according to claim 1 wherein the conveyor comprises an inside edge and an outside edge, and wherein the guiding structure comprises an inside support framework and an outside support framework adapted for carrying the inside edge and the outside edge, respectively.

7. The spiral conveyor system according to claim 1 wherein the conveyor is a self-stacking conveyor.

8. The spiral conveyor system according to claim 1 wherein the sidewalls extend downwardly from the bottom surface of the conveyor.

9. The spiral conveyor system according to claim 1 comprising a securing conveyor placed a predetermined distance above the conveyor spanning the cross-over section, the securing conveyor being adapted to be oriented parallel to the conveyor and to be moved in a same direction and at a same speed as the conveyor.

10. The spiral conveyor system according to claim 1 comprising at least one of: a cross-over liquid input placed above the conveyor spanning the cross-over section; and,
a cross-over liquid output placed below the conveyor spanning the cross-over section.

11. The spiral conveyor system according to claim 1, further comprising means for securing the items while being conveyed through the liquid.

12. A spiral conveyor system comprising:
a tank for containing a liquid at a predetermined temperature therein;
a conveyor for conveying items through the liquid;
a first spiral for guiding the conveyor in a downward direction;
a second spiral for guiding the conveyor in an upward direction;
a cross-over section for guiding the conveyor from the first spiral to the second spiral;
a first liquid input annulus placed above the first spiral; and,
a second liquid input annulus placed above the second spiral.

13. The spiral conveyor system according to claim 12 wherein the liquid output structure comprises: a first liquid output annulus placed below the first spiral; and, a second liquid output annulus placed below the second spiral.

14. The spiral conveyor system according to claim 13 comprising at least one of: a cross-over liquid input placed above the cross-over section; and, a cross-over liquid output placed below the cross-over section.

15. The spiral conveyor system according to claim 13 wherein the first liquid output annulus and the second liquid output annulus are placed a predetermined distance above a bottom wall of the tank.

16. The spiral conveyor system according to claim 15 wherein the tank comprises a drain port and wherein the bottom wall is sloped towards the drain port.

17. The spiral conveyor system according to claim 15 comprising a liquid return connected to: the first liquid output annulus and the second liquid output annulus; and, the first liquid input annulus and the second liquid input annulus.

18. The spiral conveyor system according to claim 17 wherein the liquid return comprises a liquid heating/cooling apparatus and a pump.

19. A spiral conveyor system comprising:
a tank for containing a liquid at a predetermined temperature therein;
a conveyor for conveying items through the liquid; and,
a guiding structure disposed in the tank for guiding the conveyor in a spiral-type fashion
wherein the conveyor comprises side walls such that the same form an enclosure in concert with a top surface of a conveyor section and a bottom surface of a conveyor section placed thereabove for securing the items therein while being conveyed through the liquid and
wherein the guiding structure comprises:
a spiral for guiding the conveyor in a downward direction and a sloped section for guiding the conveyor in an upward direction; or,
a spiral for guiding the conveyor in an upward direction and a sloped section for guiding the conveyor in a downward direction.

20. The spiral conveyor system according to claim 19 wherein the conveyor is a self-stacking conveyor.

21. The spiral conveyor system according to claim 19 wherein the sidewalls extend downwardly from the bottom surface of the conveyor.

* * * * *